US008930849B2

(12) United States Patent
Roberts et al.

(10) Patent No.: US 8,930,849 B2
(45) Date of Patent: Jan. 6, 2015

(54) ENHANCED MEDIA CONTENT TAGGING SYSTEMS AND METHODS

(75) Inventors: Brian F. Roberts, Dallas, TX (US); Donald H. Relyea, Dallas, TX (US); Greg A. Johns, Irving, TX (US); Shannon M. Lyons, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 602 days.

(21) Appl. No.: 12/751,828

(22) Filed: Mar. 31, 2010

(65) Prior Publication Data

US 2011/0246937 A1 Oct. 6, 2011

(51) Int. Cl.
| | |
|---|---|
| G06F 3/048 | (2013.01) |
| G11B 27/034 | (2006.01) |
| G11B 27/10 | (2006.01) |
| G11B 27/28 | (2006.01) |
| G11B 27/32 | (2006.01) |
| G11B 27/34 | (2006.01) |

(52) U.S. Cl.
CPC ............ *G11B 27/034* (2013.01); *G11B 27/105* (2013.01); *G11B 27/28* (2013.01); *G11B 27/322* (2013.01); *G11B 27/34* (2013.01)
USPC ........................................................ 715/810

(58) Field of Classification Search
USPC ................................................. 715/230, 810
See application file for complete search history.

(56) References Cited

U.S. PATENT DOCUMENTS

| | | | |
|---|---|---|---|
| 6,868,225 B1 * | 3/2005 | Brown et al. ................. | 386/239 |
| 7,661,121 B2 | 2/2010 | Smith et al. | |
| 8,082,504 B1 * | 12/2011 | Tischer ......................... | 715/720 |
| 2005/0246373 A1 * | 11/2005 | Faulkner et al. ........... | 707/104.1 |
| 2007/0244903 A1 * | 10/2007 | Ratliff et al. .................... | 707/10 |
| 2008/0091723 A1 | 4/2008 | Zuckerberg et al. | |
| 2008/0207137 A1 | 8/2008 | Maharajh et al. | |
| 2009/0182644 A1 | 7/2009 | Panagopulos et al. | |
| 2009/0210779 A1 * | 8/2009 | Badoiu et al. ................. | 715/230 |
| 2009/0228492 A1 | 9/2009 | Valdez et al. | |
| 2009/0254823 A1 * | 10/2009 | Barrett .......................... | 715/716 |
| 2010/0169786 A1 * | 7/2010 | O'Brien et al. ............... | 715/738 |

\* cited by examiner

*Primary Examiner* — Matt Kim
*Assistant Examiner* — William Trapanese

(57) ABSTRACT

Exemplary enhanced media content tagging systems and methods are described herein. An exemplary method includes a media content tagging system recording a live transmission of media content in response to a user request that the media content be recorded, receiving, from a media content access device, tag data representative of a user-defined tag specifying a segment of the media content, optimizing the user-defined tag, and distributing the optimized user-defined tag to another media content access device for use by the another media content access device to identify and present the segment of the media content. In certain embodiments, the optimization of the user-defined tag may be based on an analysis of aggregated user-defined tags, an analysis of the media content, or a combination thereof. Corresponding methods and systems are also disclosed.

19 Claims, 18 Drawing Sheets

ENHANCED MEDIA CONTENT TAGGING SYSTEMS AND METHODS

BACKGROUND INFORMATION

Set-top boxes and other media content access devices are often configured to provide users with access to a large number and variety of media content choices. For example, a user may choose to experience a variety of broadcast television programs, pay-per-view services, video-on-demand programming, Internet services, and audio programming via a set-top box. In addition, certain media content access devices include a digital video recording ("DVR") application capable of recording a live transmission (e.g., a broadcast or multicast) of a media content program to local storage for subsequent access and viewing by a user.

Certain segments within a recorded media content program may be of more interest to a user than other segments within the media content program. Accordingly, technologies have been developed that allow a user of a DVR device to mark segments within a recorded media content program as points of interest and to share the points of interest with another user's DVR device. If the other user's DVR device has also recorded the media content program, the shared data may be utilized by the other user's DVR device to access and present the marked segments for experiencing by the other user.

However, there remains room to improve such media segment marking and sharing technologies. As an example, it is not uncommon for a user to mark a segment of a media content program in a way that will produce a less than ideal user experience when data representative of the marked segment is used to access and present the segment. For instance, a segment may be marked such that the segment omits part of a scene of a media content program. To illustrate, when presentation of a particular scene in the media content program begins, a user viewing the media content program may decide that the scene is interesting enough to mark and share. The user may then provide input requesting that the segment be marked. However, one or more delays may exist between when presentation of scene commences, when the user decides that the segment is worth marking, when the user provides input requesting that the segment be marked, and when the user's device actually processes the request and defines a starting point for the marked segment. Consequently, the starting point of the segment may not coincide with the beginning of the scene, which may cause a user to miss the beginning of the scene whenever data representative of the marked segment is utilized to access and experience the segment. This is just one example of how a segment of a media content program may be marked in a way the produces a less than ideal user experience.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary enhanced media content tagging systems and methods are described herein. As described in more detail below, one or more of the exemplary systems and methods disclosed herein may provide one or more enhanced functionalities and/or features associated with media content tagging. The enhanced functionalities and/or features may facilitate quality user experiences when media content tags are used to access and present media content and/or data representative of media content to one or more users.

As used herein, the term "media content" may refer generally to any content that may be recorded, accessed, and/or presented by a media content access device for experiencing by a user of the media content access device. The term "media content program" as used herein may refer generally to any instance of media content such as a television program, on-demand media program, pay-per-view media program, broadcast media program (e.g., broadcast television program), multicast media program, narrowcast media program, IPTV program, video program, audio program, streamed media program, recorded live transmission of a media program (e.g., recorded broadcast, multicast, or narrowcast transmission of the media program), advertisement, and any other form of media content that may be recorded, accessed, and/or presented by a media content access device. A "segment" of media content or of a media content program may include any continuous portion of the media content or media content program that may be specified by a media content tag as described herein. The portion may make up a subset or substantially all of the media content or media content program.

The terms "media content tagging" and "tagging" are used interchangeably herein to refer to any operation or operations related to creation, management, optimization, and/or use of data associated with media content that may be used for accessing and presenting the media content and/or data representative of the media content to one or more users. For example, a tag may be generated and associated with media content. The tag may include information descriptive of or otherwise related to the media content. For example, the tag may specify, without limitation, one or more user profiles associated with media content, one or more segments of the media content (e.g., a start point and an end point of a segment of the media content), and a label for the tag and/or media content. The tag may be used by a media content access device to access and present the media content (e.g., a segment of the media content) and/or data representative of the media content (e.g., a menu list of media content) to one or more users.

Exemplary enhanced media content tagging systems and methods will now be described in reference to the drawings.

Figure 1:
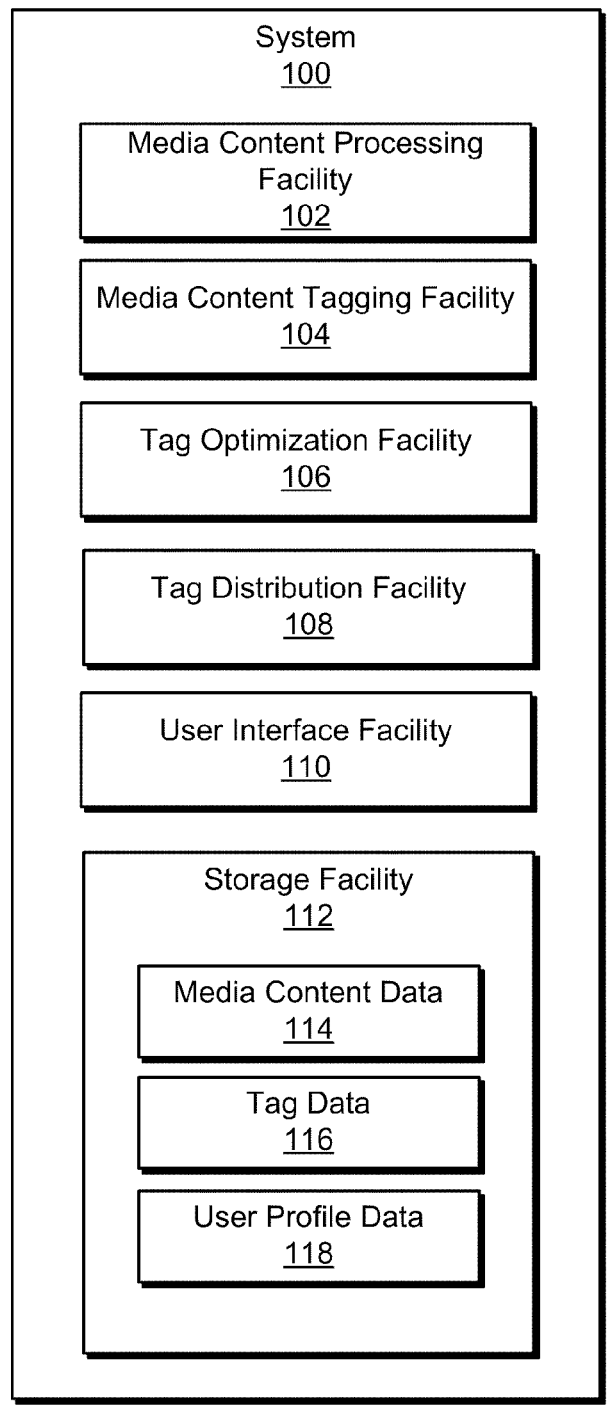
FIG. 1 illustrates an exemplary enhanced media content tagging system.

FIG. 1 illustrates an exemplary enhanced media content tagging system 100 (or simply "system 100"). As shown, system 100 may include, without limitation, a media content processing facility 102 (or simply "processing facility 102"), a media content tagging facility 104 (or simply "tagging facility 104"), a tag optimization facility 106, a tag distribution facility 108, a user interface facility 110, and a storage facility 112 selectively and communicatively coupled to one another. Any suitable communication technologies, including any of the communication technologies mentioned herein, may be employed to facilitate communications between facilities 102-112. Each of these facilities will now be described in more detail.

Processing facility 102 may be configured to process media content, including encoding, transmitting, receiving, decoding, recording, and/or presenting media content for experiencing by a user. In certain embodiments, processing facility 102 may be configured to receive and record a live transmission of media content (e.g., a broadcast, multicast, or narrowcast transmission of media content). For example, processing facility 102 may include a digital video recording ("DVR") configured to record one or more live transmissions of a media content program to storage facility 112 for subsequent access and presentation to a user. Recorded media content may be stored as media content data 114 in storage facility 112.

Tagging facility 104 may be configured to tag media content, which may include generating data representative a tag and assigning the tag to media content. Data representative of a tag may be stored as tag data 116 in storage facility 112. A tag may include any information descriptive of or otherwise associated with media content, including, without limitation, information indicating one or more user profiles associated with the media content, an identifier for the media content (e.g., a media content program identifier), a segment of the media content (e.g., a start point and an end point of a segment of the media content), and a label for the tag and/or a segment of the media content specified by the tag. One or more user profiles that are available for association with a media content tag may be stored as user profile data 118 in storage facility 112. A tag specifying a user profile associated with media content may be referred to as a "user profile tag."

In certain embodiments, a tag may be user-defined. To this end, tagging facility 104 may provide one or more tagging tools configured to allow a user to provide user input defining a tag. Tagging facility 104 may receive the user input and generate, modify, and/or delete a user-defined tag based on the user input. A tag defined by user input may be referred to as a "user-defined tag."

Additionally or alternatively, in certain embodiments, tagging facility 104 may be configured to automatically generate and/or modify a tag without user input. As described in more detail further below, for example, in response to a recording of media content by processing facility 102, tagging facility 104 may generate a tag automatically such as by determining a user profile associated with the recording of the media content, generating a user profile tag associated with the user profile, and associating the user profile tag with the recorded media content.

Tag optimization facility 106 may be configured to optimize a media content tag. An optimization of a media content tag may include a performance of one or more operations on and/or related to the media content tag and that are configured to promote a quality user experience when the tag is used by a media content access device to identify, access, and present the media content specified by the tag and/or data representative of the media content to a user.

As an example, in certain embodiments, optimization of a media content tag may include aggregating the tag with one or more other tags based on at least one attribute common to the tag and the one or more other tags, analyzing the tag compared to the one or more other tags, and performing one or more operations based on the analysis. For example, tag data representative of the tag may be modified based on the analysis. Additionally or alternatively, the tag may be selected, from the aggregation of the tag and the one or more other tags, for distribution based on the analysis. Accordingly, system 100 may distribute a quality media content tag and avoid distributing other media content tags that may be determined, based on the analysis, to be of lesser quality than the selected media content tag.

In certain embodiments, the optimization of the tag may include analyzing data representative of the media content with which the tag is associated and modifying the tag based on the analysis, such as by adjusting at least one of a start point and an end point of a segment of the media content defined by the tag based on the analysis. In some examples, the analyzed data representative of the media content may include in-stream data included in a media content stream carrying the media content. In other examples, the analyzed data representative of the media content may include metadata associated with the media content.

Examples of optimization of a media content tag are described in more detail further below.

Tag distribution facility 108 may be configured to distribute data representative of a media content tag to one or more media content access devices. For example, system 100 may receive a request for a media content tag from a media content access device and transmit data representative of the tag to the media content access device, which may use the tag to identify, access, and present the media content specified in the tag.

User interface facility 110 may be configured to receive user input and provide user output and may include any hardware, firmware, software, or combination thereof supportive of input and output capabilities. For example, user interface facility 110 may include one or more devices for capturing user input, including, but not limited to, a microphone, speech recognition technologies, keyboard or keypad, receiver (e.g., an RF or infrared receiver), and one or more input buttons. User interface facility 110 may additionally or alternatively include one or more devices for presenting output to a user, including, but not limited to, a graphics engine, a display device (e.g., a display screen), one or more output drivers (e.g., display drivers), one or more audio speakers, and one or more audio drivers.

In certain embodiments, user interface facility 110 may be configured to generate and provide one or more graphical user interfaces ("GUIs") for display, including any of the exemplary GUIs described herein. Certain GUIs provided by user interface facility 110 may be configured to provide a user with one or more tools and/or selectable options related to media content tags. As described in detail further below, for example, in one or more exemplary GUIs, a user may provide input that directs system 100 to request access to data representative of one or more media content tags and/or to search and/or filter GUI content based on media content tags.

Storage facility 112 may be configured to maintain media content data 114, tag data 116, and user profile data 118. It will be recognized that storage facility 110 may maintain additional or alternative data as may serve a particular application. Storage facility 112 may include or be implemented by one or more computer-readable storage media and/or devices, including by a network storage device, a client storage device, or a combination thereof.

Figure 2:
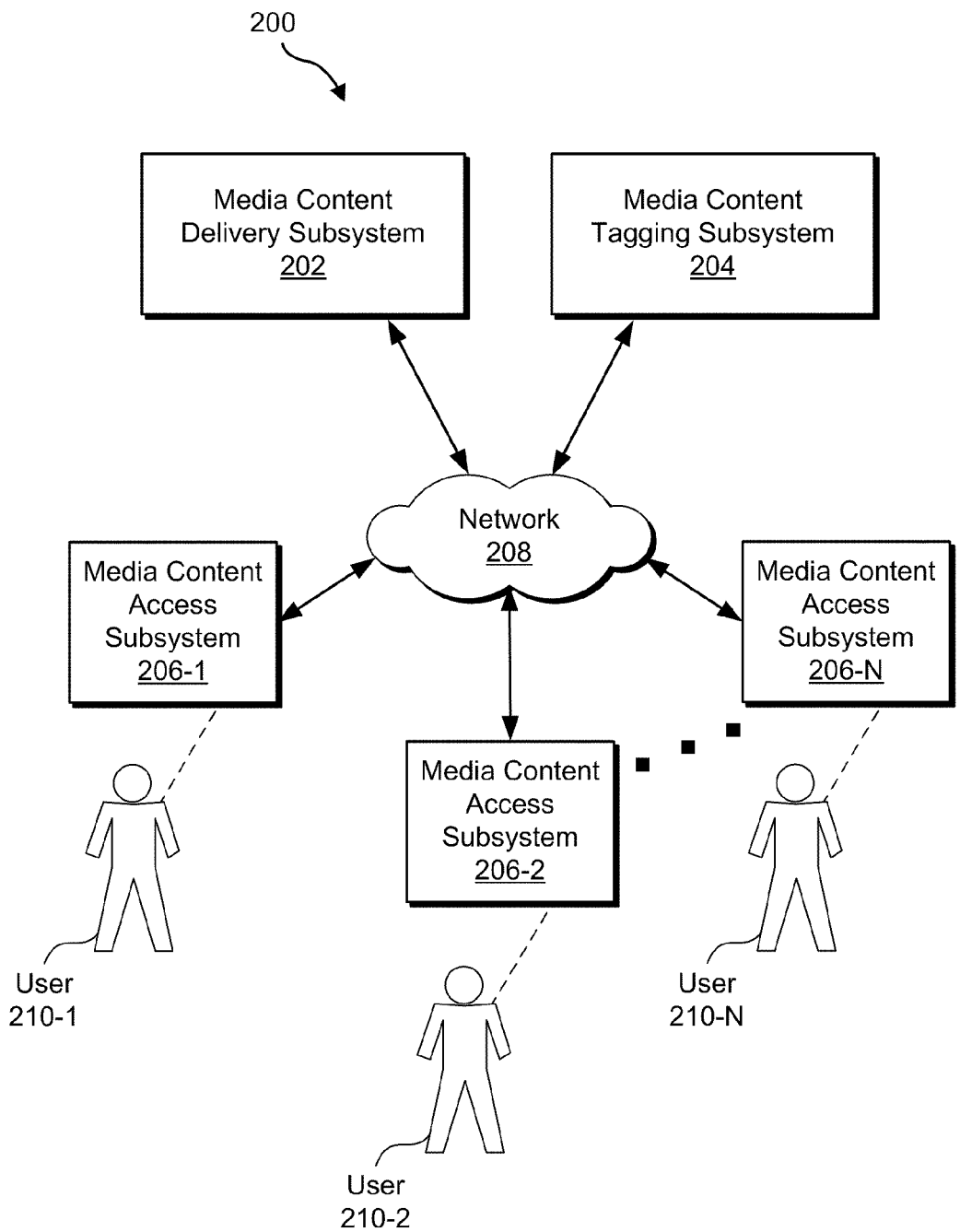
FIG. 2 illustrates an exemplary implementation of the system of FIG. 1.

FIG. 2 illustrates an exemplary implementation 200 of system 100. As shown in FIG. 2, implementation 200 may include a media content delivery subsystem 202 (or simply "delivery subsystem 202"), a media content tagging subsystem 204 (or simply "tagging subsystem 204"), and one or more media content access subsystems 206 (e.g., media content access subsystems 206-1 through 206-N) in communication with one another via a network 208.

Access subsystems 206 may be associated with one or more users, which in certain embodiments may be subscribers to or end users of one or more services (e.g., a media content delivery service and/or a media content tagging service) provided over network 208. As an example, FIG. 2 shows users 210-1, 210-2, and 210-N (collectively "users 210") as being associated with access subsystems 206-1, 206-2, and 206-N, respectively. The exemplary users 210 and their particular associations with access subsystems 206 are shown for illustrative purposes. Other user associations with access subsystems 206 may be defined in system 200.

While an exemplary implementation 200 of system 100 is shown in FIG. 2, the configuration of implementation 200 illustrated in FIG. 2 is not intended to be limiting. Additional or alternative configurations may be used in other embodiments. In certain alternative embodiments, for example, delivery subsystem 202 and tagging subsystem 204 may be integrated together and/or may be configured to communicate directly without going through network 208.

Any of the components of system 100 may be implemented by one or more of the components of system 200. For example, tag optimization facility 106 may be implemented entirely in tagging subsystem 204, entirely in one or more media content access subsystems 206, or distributed across tagging subsystem 204 and one or more media content access subsystems 206 in implementation 200. Accordingly, one or more of the tag optimization operations described herein may be performed by tagging subsystem 204, one or more media content access subsystems 206, or a combination of tagging subsystem 204 and one or more media content access subsystems 206.

In implementation 200, delivery subsystem 202, tagging subsystem 204, and access subsystems 206 may communicate using any suitable communication technologies, devices, networks, media, and protocols supportive of remote data communications. For example, delivery subsystem 202, tagging subsystem 204, and access subsystems 206 may communicate over network 208 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 208 may include one or more networks or types of networks (and communication links thereto) capable of carrying communications, media content, and/or data signals between delivery subsystem 202, tagging subsystem 204, and access subsystem 206. For example, network 208 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying media content, data, and/or communications signals between delivery subsystem 202, tagging subsystem 204, and access subsystem 206. Communications between delivery subsystem 202, tagging subsystem 204, and access subsystem 206 may be transported using any one of the above-listed networks, or any combination or sub-combination of the above-listed networks.

Delivery subsystem 202 may include or be implemented on any computing device or combination of computing devices, such as one or more servers, video head-end units, video switching office equipment, video hub office equipment, or the like. Delivery subsystem 202 may be configured to transmit and/or receive communication signals, media content, and/or data to/from access subsystems 206 via network 208. In some examples, delivery subsystem 202 may be configured to transmit (e.g., broadcast, multicast, and/or narrowcast) data representative of one or more media content programs to one or more access subsystems 206. The media content programs may be transmitted in one or more media content streams. In certain examples, media content may be transmitted by way of a live transmission in accordance with a transmission schedule (e.g., a television programming schedule). Additionally or alternatively, in certain embodiments, delivery subsystem 202 may be configured to transmit one or more media content programs on-demand (e.g., VOD programs) in response to requests for the media content program(s) received from one or more access subsystems 206.

Figure 3:
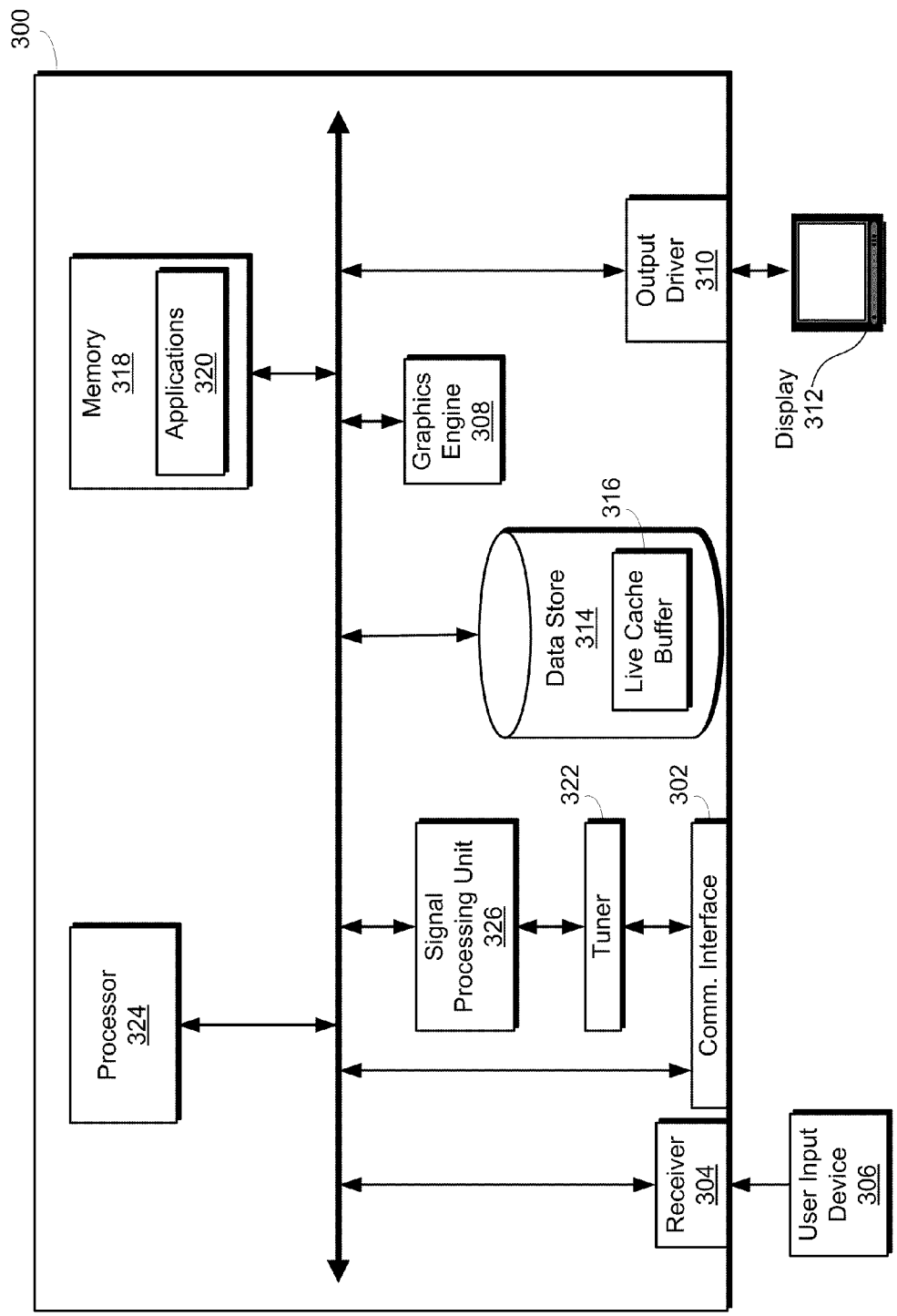
FIG. 3 illustrates an exemplary media content access device implementing the media content access subsystem of FIG. 2.

An access subsystem 206 may be implemented by one or more computing devices. To illustrate, FIG. 3 shows an exemplary media content access device 300 having an access subsystem 206 implemented thereon. Device 300 may be configured to perform one or more of the access subsystem processes and/or operations described herein. Device 300 may include, but is not limited to, a set-top box, a media content processing device, a communications device, a mobile device (e.g., a mobile phone device), a handheld device, a personal computer, a phone device (e.g., a Verizon Hub device), a personal-digital assistant device, a gaming device, a digital video recording ("DVR") device (e.g., a personal video recording PVR device), a television device, and/or any device configured to perform one or more of the access subsystem processes and/or operations described herein.

As shown in FIG. 3, device 300 may include a communication interface 302, which may be configured to receive media content, tag data, and/or other data (e.g., metadata, program guide data, and/or any other data associated with media content and/or tag data) in any acceptable format from delivery subsystem 202, tagging subsystem 204, and/or from any other suitable external source. Communication interface 302 may include any device, logic, and/or other technologies suitable for receiving signals, media content, and/or data. Communication interface 302 may be configured to interface with any suitable communication media, protocols, and formats, including any of those mentioned above.

Device 300 may also include a receiver 304 configured to receive user input signals from a user input device 306. User input device 306 may include, for example, a remote control device or any other suitable input device and may be configured to communicate with receiver 304 via a wireless link, electrical connection, or any other suitable communication link.

Device 300 may include a graphics engine 308 and an output driver 310. Graphics engine 308 may be configured to generate graphics to be provided to output driver 310, which may be configured to interface with or drive a display 312. Output driver 310 may provide output signals to display 312, the output signals including graphical data (e.g., graphical data representative of media content) generated by graphics engine 308 and to be presented by display 312 for experiencing by a user 210. Graphics engine 308 and output driver 310 may include any combination of hardware, software, and/or firmware as may serve a particular application.

Data store 314 may include one or more data storage media, devices, or configurations and may employ any type, form, and combination of storage media. For example, data store 314 may include, but is not limited to, a hard drive, network drive, flash drive, magnetic disc, optical disc, or other non-volatile storage unit. Electronic data, including data disclosed herein, may be temporarily and/or permanently stored in data store 314.

Data store 314 is shown to be included within device 300 in FIG. 3 for illustrative purposes only. It will be understood that data store 314 may additionally or alternatively be located external to device 300.

Data store 314 may include one or more live cache buffers 316. Live cache buffer 316 may additionally or alternatively reside in memory 318 or in a storage device external to device 300. In some examples, media content data may be temporarily stored in live cache buffer 316 to facilitate viewing and/or recording of the media content.

Device 300 may include memory 318. Memory 318 may include, but is not limited to, FLASH memory, random access memory ("RAM"), dynamic RAM ("DRAM"), other suitable computer-readable media, or any combination or sub-combination thereof. In some examples, one or more applications 320 configured to run on or otherwise be executed by device 300 may reside in memory 318.

Device 300 may include one or more tuners 322. Tuner 322 may be configured to selectively receive media content carried on a particular media content carrier channel such that the media content may be processed by device 300. In some examples, media content received by tuner 322 may be temporarily buffered, or stored, in the live cache buffer 316. If there are multiple tuners 322, there may be a live cache buffer 316 corresponding to each of the tuners 322.

While tuner 322 may be used to receive certain media content carrying signals transmitted by delivery subsystem 202, device 300 may be configured to receive other types of media content signals (including media content signals and/or program guide data signals) from delivery subsystem 202 and/or one or more other sources without using a tuner. For example, delivery subsystem 202 may transmit digital streams of data packets (e.g., IP-based data packets) that can be received without using a tuner. For such types of media content signals, communication interface 302 may receive and forward the signals directly to other components of device 300 (e.g., processor 324 or signal processing unit 326, described in more detail below) without the signals going through tuner 322. For an IP-based signal, for example, signal processing unit 326 may function as an IP receiver.

Device 300 may include at least one processor, such as processor 324, configured to control and/or perform one or more operations of device 300. Device 300 may also include a signal processing unit 326 configured to process incoming media content. Signal processing unit 326 may be configured, for example, to demodulate and parse encoded digital media content. In some examples, device 300 may include one or more signal processing units 326 corresponding to each of the tuners 322.

The device 300 shown in FIG. 3 is illustrative only. Access subsystem 206 may include or be implemented on one or more other suitable devices in other embodiments.

Returning to FIG. 2, tagging subsystem 204 may be configured to perform one or more of the media content tagging operations described herein, including performing one or more of the tag optimization operations described herein. For example, tagging subsystem 204 may be configured to receive tag data representative of one or more media content tags from one or more access subsystems 206, optimize one or more of the media content tags, and distribute one or more of the optimized tags to one or more access subsystems 206. In certain embodiments, tagging subsystem 204 may be configured to provide a media content tag service that allows participating users 210 to publish tag data representative of media content tags to tagging subsystem 204 and to request and access tag data representative of optimized media content tags from tagging subsystem 204.

Figure 4:
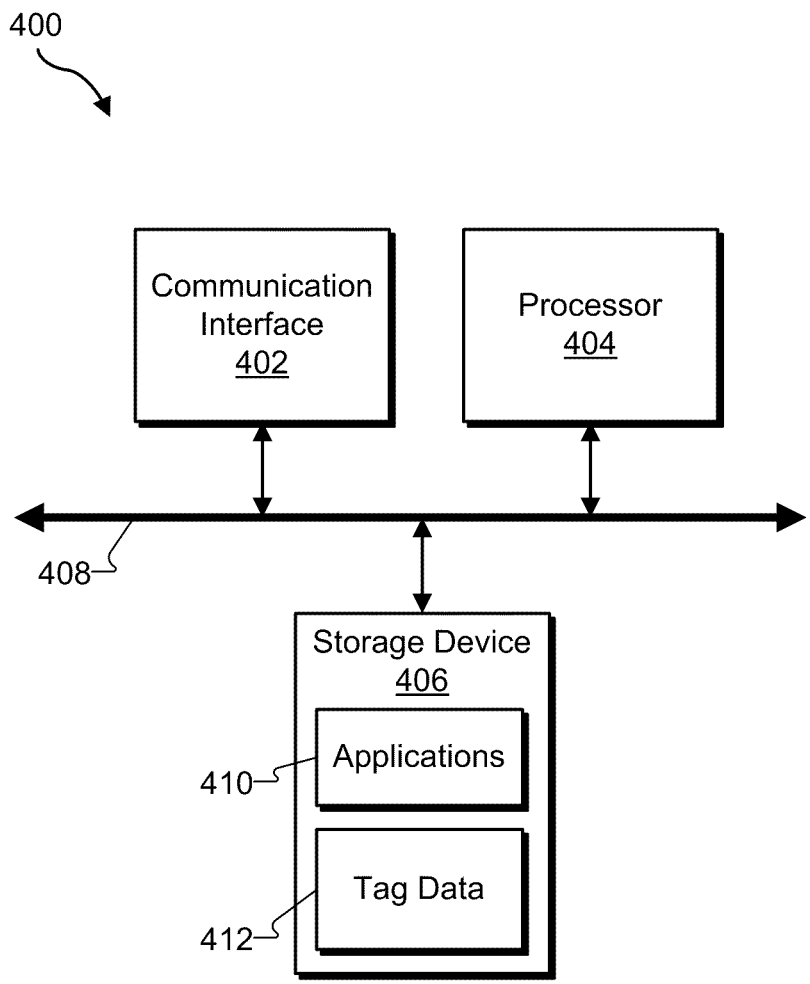
FIG. 4 illustrates exemplary components of the tagging subsystem of FIG. 2.

Tagging subsystem 204 may include or be implemented on any computing device or combination of computing devices, such as one or more server devices, or the like. To illustrate, FIG. 4 shows exemplary components of tagging subsystem 204. As shown, tagging subsystem 204 may include a communication interface 402, a processor 404, and a storage device 406 communicatively coupled one to another via a communication infrastructure 408. The components of tagging subsystem 204 may communicate with one another, including sending data to and receiving data from one another, using any suitable communication technologies. Moreover, the components of tagging subsystem 204 may be implemented on any computing device or combination of computing devices, such as one or more servers, personal computers, or the like.

While an exemplary tagging subsystem 204 is shown in FIG. 4, the components illustrated in FIG. 4 are not intended to be limiting. Additional or alternative components may be used in other embodiments. Components of the tagging subsystem 204 shown in FIG. 4 will now be described in additional detail.

Communication interface 402 may be configured to communicate with one or more computing devices, including access subsystems 206. In particular, communication interface 402 may be configured to transmit and/or receive communication signals, media content, and/or data to/from access subsystems 206. Examples of communication interface 402 include, without limitation, a wired network interface (such as a network interface card), a wireless network interface (such as a wireless network interface card), a modem, and any other suitable interface. In at least one embodiment, communication interface 402 may provide a direct connection between tagging subsystem 204 and access subsystems 206 via a direct link to a network, such as the Internet. Communication interface 402 may additionally or alternatively provide such a connection through, for example, a local area network (such as an Ethernet network), a personal area network, a telephone or cable network, a cellular telephone connection, a satellite data connection, or any other suitable connection.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 410 or other computer-executable instructions such as may be stored in storage device 406 or another computer-readable medium.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including tag data 412 and/or other data described herein, may be temporarily and/or permanently stored in storage device 406. For example, data representative of one or more executable applications 410 configured to direct processor 404 to perform any of the operations described herein may be stored within storage device 406. In some examples, data may be arranged in one or more databases residing within storage device 406.

Several exemplary enhanced media content tagging methods will now be described. While the methods are described in accordance with certain exemplary embodiments, other embodiments may omit, add to, reorder, combine, and/or modify any of the exemplary methods or steps in the exemplary methods. One or more of the exemplary methods or steps in the exemplary methods may be performed by one or more components of system 100.

Figure 5:
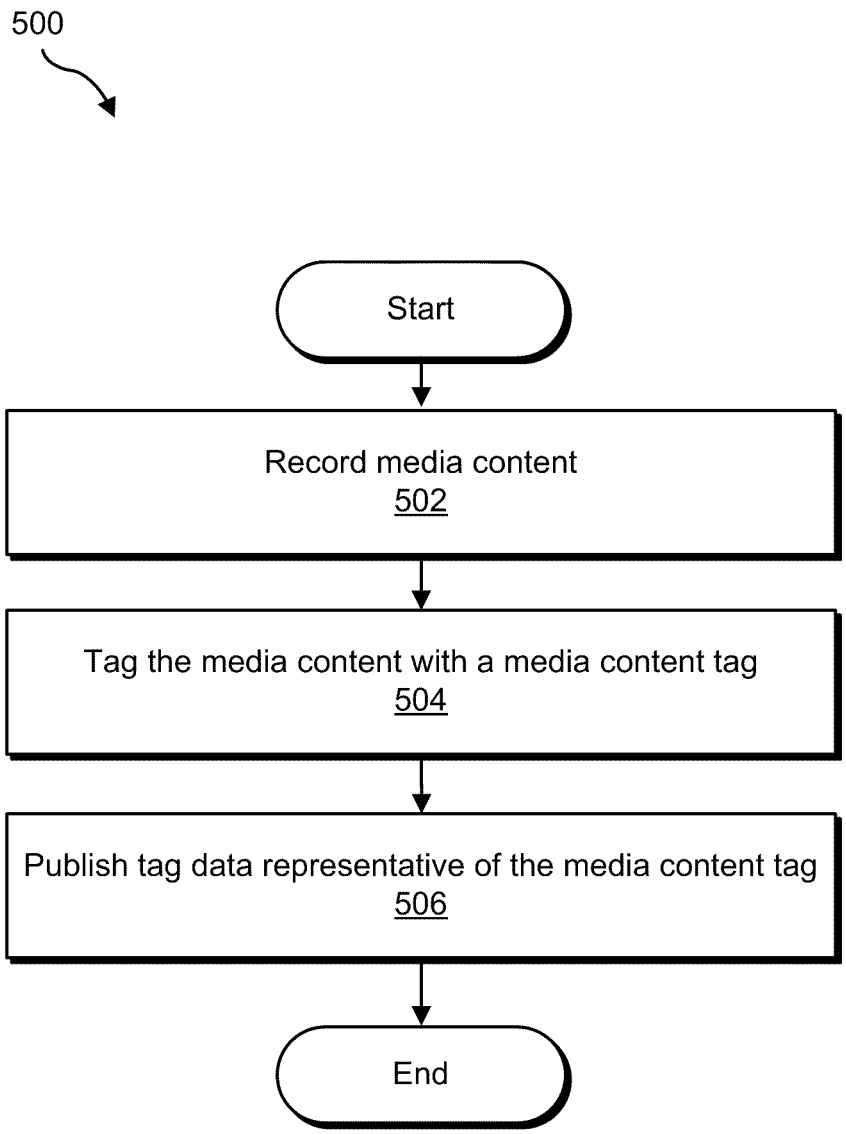
FIG. 5 illustrates an exemplary enhanced media content tagging method.

FIG. 5 illustrates an exemplary enhanced media content tagging method 500. In step 502, media content is recorded. For example, a live transmission of media content may be recorded to a network or client storage device. In certain embodiments, a media content access device may record media content to local storage.

The media content may be recorded in response to a user request that the media content be recorded. The request may be in any form that schedules or initiates a recording of the media content.

In step 504, the media content is tagged with a media content tag. For example, a media content tag may be associated with the media content. Step 504 may also include generating and/or updating the media content tag before the tag is associated with the media content. The tag may include any information descriptive of or otherwise related to the media content, including any of the information described above.

In certain embodiments, the media content tag may comprise a user-defined tag including information defined based on input provided by a user. User input that may be used to define the media content tag may be received by system 100 in any suitable way. For example, system 100 may provide one or more tools configured to allow a user to provide user input defining a media content tag. The tools may be provided to the user in any suitable way, including by inclusion in a GUI or other user interface.

Figure 6:
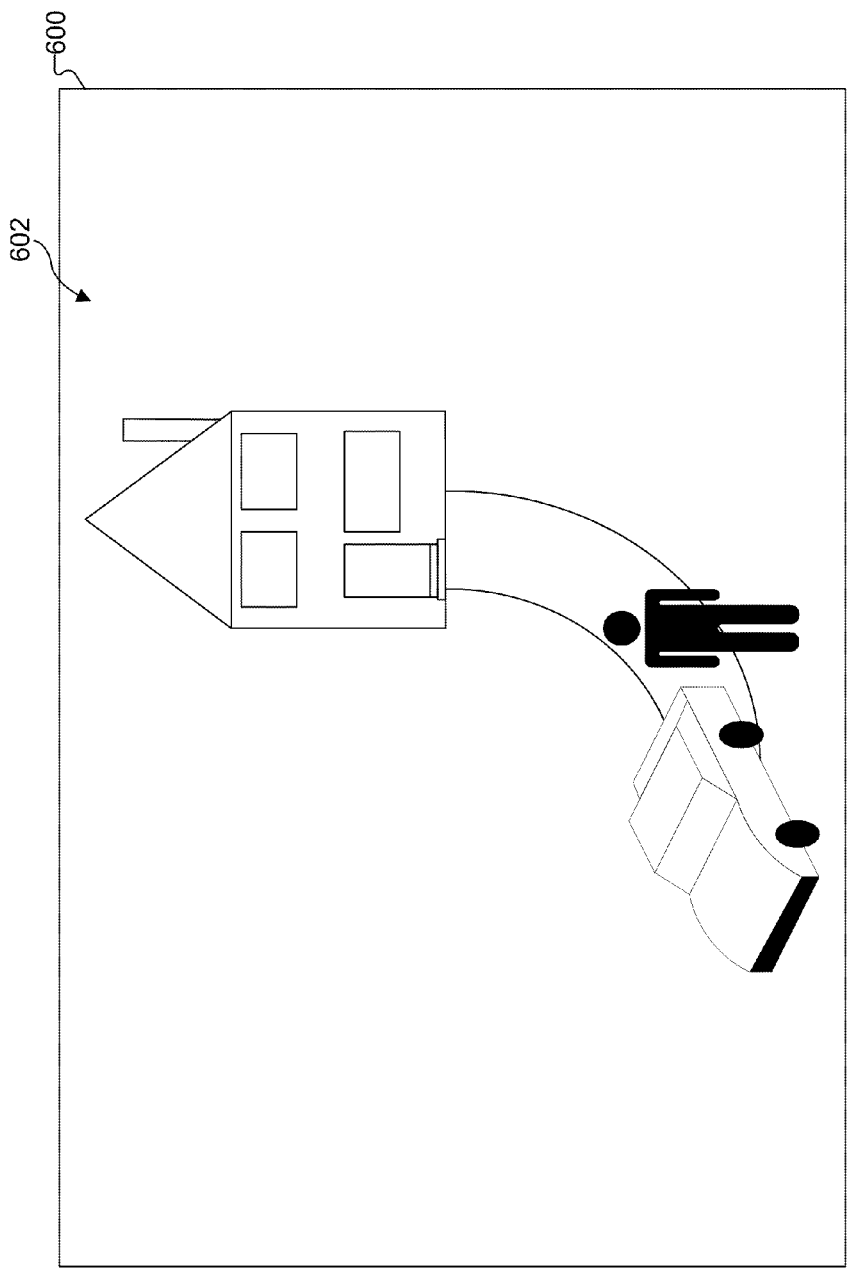
FIG. 6 illustrates a graphical user interface having an exemplary media content presentation view displayed therein.
Figure 7:
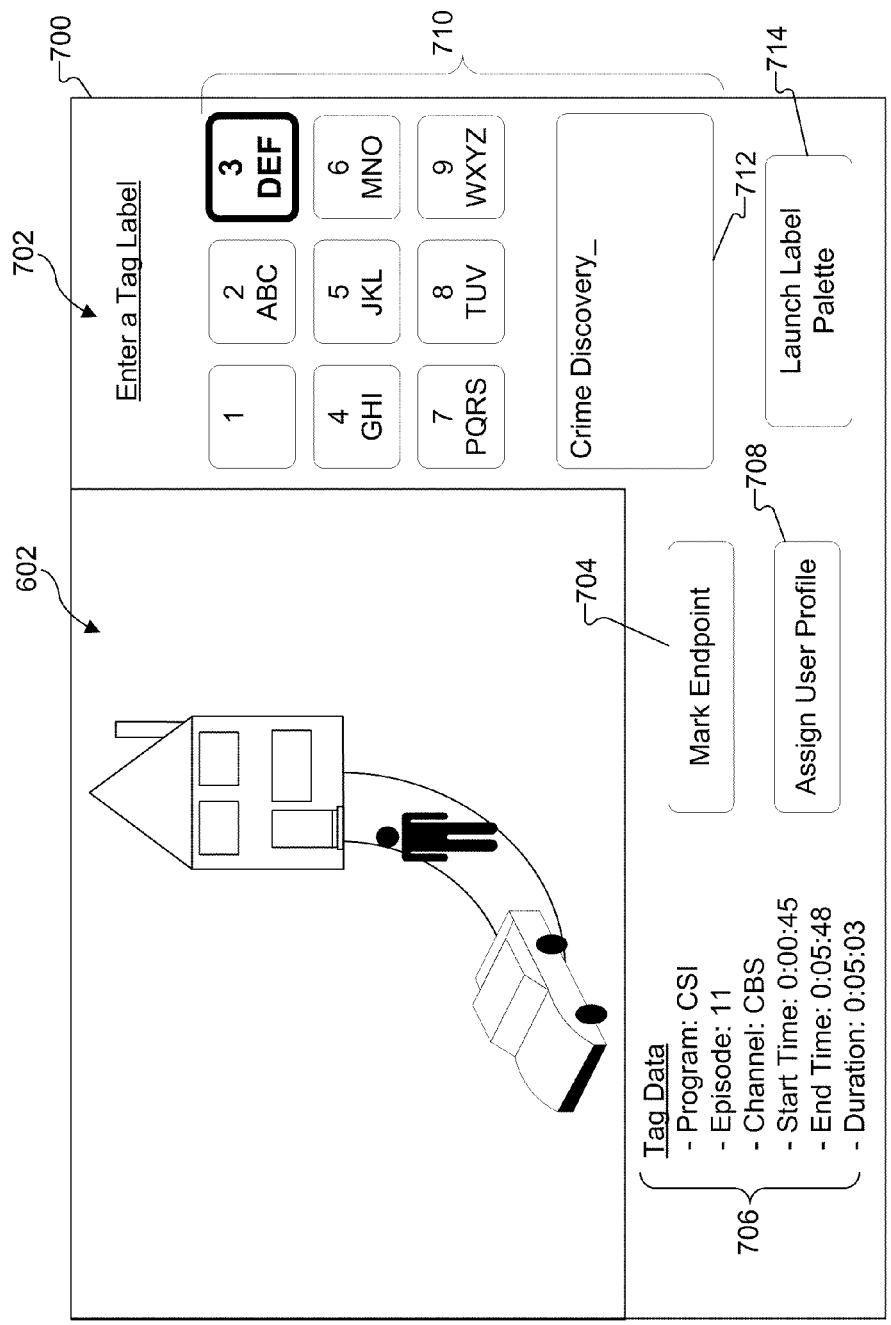
FIG. 7 illustrates an exemplary graphical user interface having a tag data capture view displayed therein.
Figure 8:
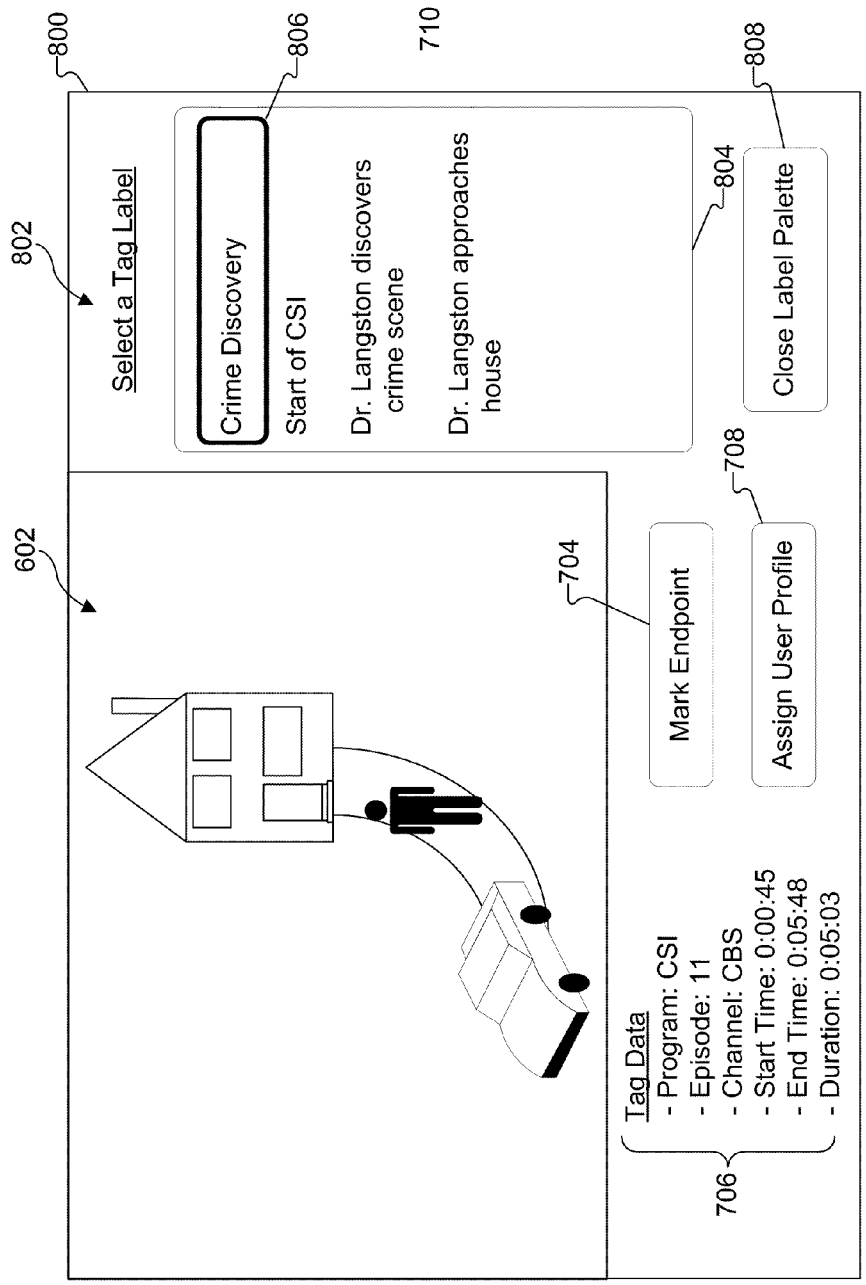
FIG. 8 illustrates a graphical user interface having an exemplary tag label palette view displayed therein.

To help facilitate an understanding of tools that may be provided to facilitate generation of a media content tag based on user input, FIGS. 6-8 illustrate GUIs displaying exemplary views associated with capturing user input for use in generating a user-defined tag.

FIG. 6 illustrates a GUI 600 having an exemplary media content presentation view 602 displayed therein. As shown in FIG. 6, GUI 600 may provide a full-screen display of media content presentation view 602. A media content program may be presented (e.g., played back) within media content presentation view 602. In FIG. 6, an on-screen image of the media content program being presented in media content presentation view 602 is displayed.

During presentation of the media content program in media content presentation view 602, user input may be received. The user input may indicate a desire of a user to define a tag for the media content program presented in media content presentation view 602. The user input may be provided by the user in any suitable way and/or format. In response to receipt of the user input, system 100 may provide one or more tools configured to facilitate receipt of user input from the user for use in generating a tag.

In certain embodiments, for instance, system 100 may provide a tag data capture view for display. For example, FIG. 7 illustrates a GUI 700 having an exemplary tag data capture view 702 displayed therein. As shown in FIG. 7, GUI 700 may include media content presentation view 602 displayed within a partial-screen display in GUI 700. Presentation (e.g., playback) of the media content program may continue in media content presentation view 602 in GUI 700.

Tag data capture view 702 may include information and/or one or more tools associated with capture of tag data. For example, tag data capture view 702 may include a segment definition tool 704 configured to allow a user to provide input defining a segment of the media content program. In GUI 700, segment definition tool 704 includes a selectable object that may be selected to indicate a start point and/or an end point of a segment of the media content program. Alternatively, actuation of a button on user input device 306 may define an endpoint of a segment. Accordingly, a user may provide input that may be used by system 100 to define endpoints of a segment of the media content program. An endpoint of the segment may coincide with a position at which playback of the media content program is located when segment definition tool 704 is selected by the user.

Tag data capture view 702 may also include graphical data representative of information 706 associated with the tag. The information 706 indicated in GUI 700 includes a media content program identifier (e.g., "CSI"), an episode identifier (e.g., "11"), a channel identifier (e.g., "CBS"), a start time identifier (e.g., "0:00:45") indicative of a start point of a segment of the media content program, an end time identifier (e.g., "0:05:48") indicative of an end point of the segment of the media content program, and a duration identifier ("0:05:03) indicative of a duration of the segment of the media content program.

Tag data capture view 702 may include a user profile tool 710 configured to allow the user to provide user input indicating one or more user profiles to be associated with the media content tag. Accordingly, the user may provide input indicating a user profile, and system 100 may associate the user profile with the media content tag.

Tag data capture view 702 may also include a label input tool 710, which may be configured to facilitate user input of a label to be associated with the media content tag. In the illustrated example, label input tool 710 includes a plurality of selectable buttons that may be selected by the user to spell out a custom label. As the user utilizes label input tool 710 to provide a label, data representative of the label may be displayed in an input field 712 of label input tool 710, as shown in FIG. 7.

In addition or alternative to label input tool 710, system 100 may be configured to provide a label palette tool. For example, when the user selects a palette launcher 714 in GUI 700, a label palette tool may be launched and displayed for use by the user. FIG. 8 illustrates a GUI 800 having an exemplary label palette view 802 displayed therein. As shown in FIG. 8, GUI 800 may include media content presentation view 602 displayed within a partial-screen display in GUI 800. Presentation (e.g., playback) of the media content program may continue in media content presentation view 602 in GUI 800.

Label palette view 802 may include a label selection tool 804 configured to present one or more label options for selection by the user. The user may move a selection box 806 to a listed label option and select the label option. In response, system 100 may associated the selected label with the media content tag.

System 100 may be configured to populate label selection tool 804 with a list of one or more selectable label options. In certain embodiments, one or more of the label options may be contextually and/or predictively identified for inclusion in label selection tool 804. For example, system 100 may identify one or more labels that have been received in the past for the media content program, the particular episode of the media content program, similar segments of the media content program (e.g., segments having start times and/or end times within a predefined proximity of the start time and/or end time of the segment specified by the tag). Any other historical and/or contextual information available to system 100 may be used by system 100 to populate label selection tool 804 with one or more selectable label options.

A "close label palette" option 808 may be selected by the user to close label selection tool 804. In certain embodiments, the close of label selection tool 808 may cause system 100 to display GUI 700 as shown in FIG. 7.

In response to user input defining the media content tag, system 100 may generate tag data representative of the media content tag based on the user input. In addition or alternative to generating a media content tag based on user input, system 100 may be configured to automatically generate a media content tag, or at least a subset of information included in the media content tag. For example, in response to the recording of the media content program in step 502 of FIG. 5, system 100 may automatically generate a media content tag and populate the tag with information that is accessible by system 100. Such information may include metadata information associated with the media content program (e.g., a program identifier, an episode identifier, a channel identifier, etc.). The information may alternatively or additionally include a user profile associated with the recording of the media content program, such as a user profile determined to be active when the recording of the media content program is scheduled or initiated. Alternatively, a user profile that is active when a media content tag is generated based on user input may be identified and automatically associated with the tag.

Returning to FIG. 5, in step 506, tag data representative of the media content tag may be published. Step 506 may include any operation or operations that make the tag data representative of the media content tag available for distribution to and/or access and use by one or more media content access devices. For example, step 506 may include system 100 making the media content tag locally accessible to one or more applications executing on the media content access device that generated the media content tag, to one or more other media content access devices (e.g., by peer-to-peer sharing over network 208), and/or to tagging subsystem 204 for acquisition by tagging subsystem 204 for distribution from tagging subsystem 204 to one or more media content access devices.

Figure 9:
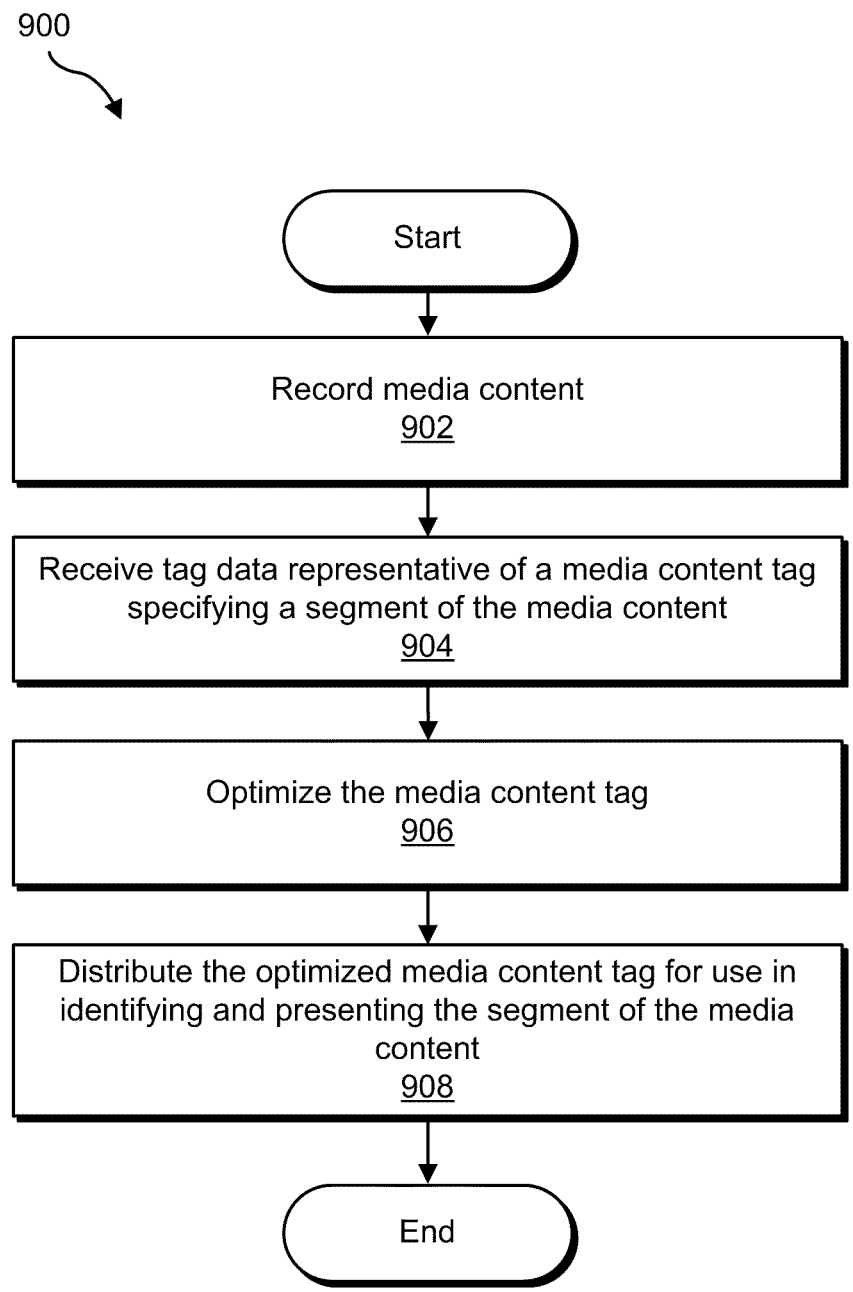
FIG. 9 illustrates an exemplary enhanced media content tagging method.

As mentioned, system 100 may be configured to optimize a media content tag. FIG. 9 illustrates an exemplary enhanced media content tagging method 900 in which a media content tag may be optimized.

In step 902, media content is recorded. The media content may be recorded in any of the ways described herein.

In step 904, tag data representative of a media content tag specifying a segment of the media content is received. The tag data may be received from the media content access device that generated the media content tag. For example, tag optimization facility 106, which may be implemented by tagging subsystem 204 and/or an access subsystem 206, may receive the tag data from tagging facility 104 after the media content tag is generated and associated with the media content by tagging facility 104.

In step 906, the media content tag is optimized. As mentioned, optimization of a media content tag may include performance of one or more operations configured to provide a quality user experience when the tag is utilized to access and display media content or data representative of media content associated with the tag. Examples of optimization of a media content tag will not be described.

Figure 10:
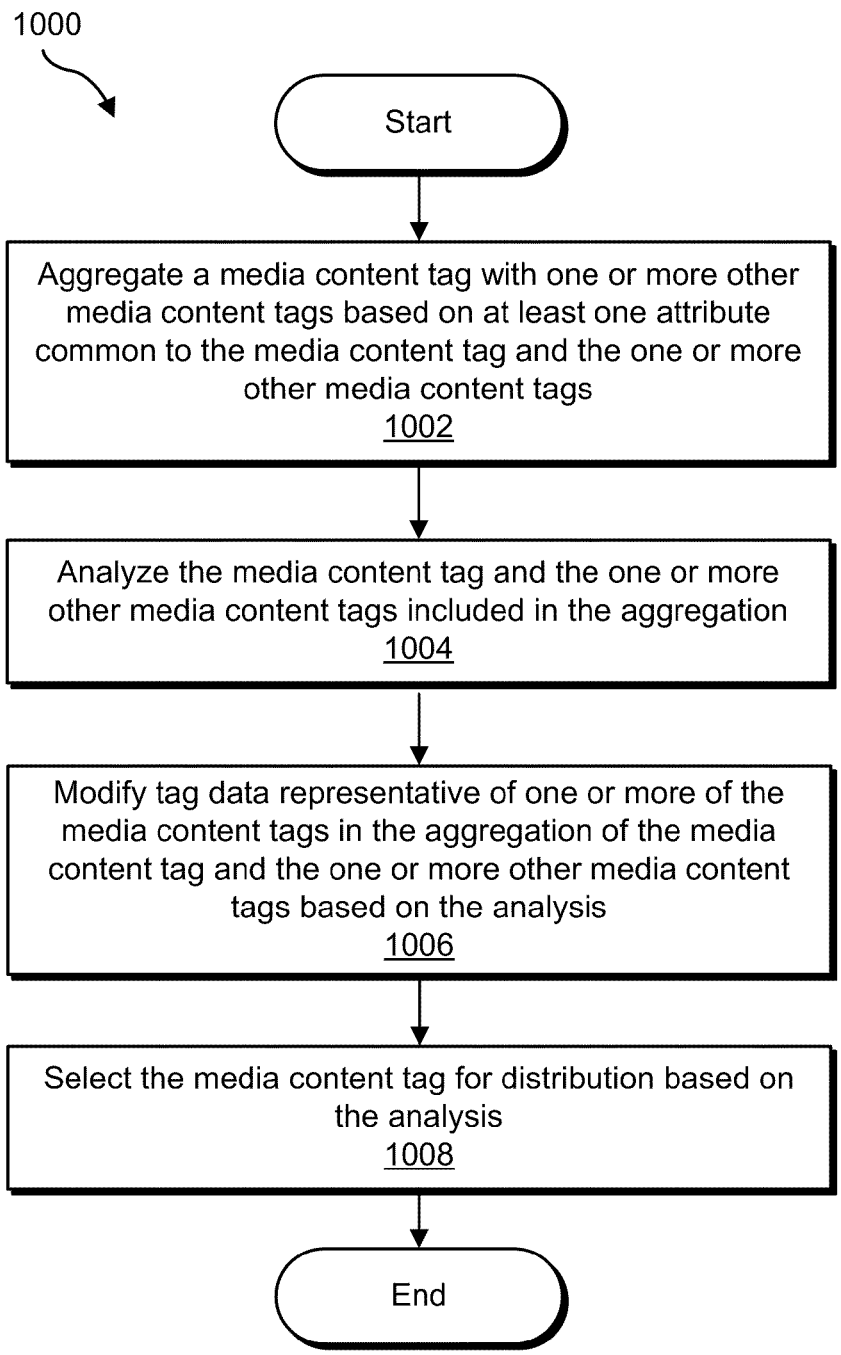
FIG. 10 illustrates an exemplary tag optimization method.

FIG. 10 illustrates an exemplary tag optimization method 1000. In step 1002, a media content tag is aggregated with one or more other media content tags based on a least one attribute common to the media content tag and the one or more other media content tags. For example, one or more media content access devices implementing media content access subsystems 206 may provide tag data representative of one or more media content tags to tagging subsystem 204, which may aggregate the media content tags based on one or more attributes that are common to the media content tags.

A common attribute may include any attribute shared by one or more of the media content tags and that may be used to aggregate the media content tags. For example, a common attribute may include, without limitation, a matching media content program identifier, a matching tag label, a matching user rating, and matching timestamp data associated with the one or more media content tags. For instance, in step 1002, one or more media content tags may be aggregated based on a matching tag label shared by the media content tags.

Tag optimization facility 106 may be configured to identify "matching" attributes based on a matching heuristic that specifies one or more conditions for a match to be determined to exist. For example, the matching heuristic may specify one or more conditions to be satisfied to support a determination that a match exists between tag labels of media content tags. In some examples, the matching heuristic may be defined such that tag optimization facility 106 may search for an exact match between tag labels or a proximate match that satisfies threshold conditions specified in the matching heuristic. Accordingly, tags having matching labels, as specified by the matching heuristic, may be aggregated.

As another example, the matching heuristic may specify one or more conditions for a match to be determined to exist between timestamp data included in media content tags. In some examples, the matching heuristic may be defined such that tag optimization facility 106 may search for proximate start points and/or end points that satisfy threshold conditions specified in the matching heuristic. In some examples, the matching heuristic may be defined such that tag optimization facility 106 may search for overlap of segments specified by media content tags that satisfies threshold overlap conditions specified in the matching heuristic. Accordingly, tags having matching timestamp data, as specified by the matching heuristic, may be aggregated. The matching timestamp data may indicate that the tags specify matching segments (e.g., overlapping or otherwise similar segments) of media content.

These examples are illustrative only. Other attributes of media content tags may be additionally or alternatively used to determine whether a match exists between media content tags. Any suitable combination of attributes of media content tags may be used to determine whether a match exists between media content tags. Accordingly, media content tags may be aggregated by tag optimization facility 106 based on one or more predetermined tag attributes as may suit a particular application.

In step 1004, the media content tag and the one or more other media content tags included in the aggregation are analyzed. The analysis may include tag optimization facility 106 analyzing of one or more attributes of the tags included in the aggregation of tags. For example, a numerical or statistical analysis may be performed on one or more attributes of the tags in the aggregation of tags. To illustrate, a numerical or statistical analysis may be performed on timestamp data to determine average start and/or end times of segments specified by the tags, the most common start and/or end times of segments specified by the tags, the most common start and/or end times of segments specified by the tags that also have user ratings that satisfy a predetermined ratings threshold, and any other information that may be determined through numerical and/or statistical analysis.

In certain embodiments, the analysis performed in step 1004 may include comparisons of attributes of tags in the aggregation of tags to one another. For example, user ratings of the tags may be compared and used to determine tags having relatively higher user ratings. As another example, timestamp data may be compared.

These examples of analysis of a tag in an aggregation of tags are illustrative only. Other analyses of one or more attributes of aggregated tags may be performed in other embodiments.

The results of the analysis performed in step 1004 may be used to modify and/or select one or more of the tags from the aggregation of tags for distribution. Accordingly, the analysis may be used by tag optimization facility 106 to select and provide tags that have been optimized to facilitate quality user experiences.

In step 1006, tag data representative of one or more of the media content tags included in the aggregation of tags may be modified based on the analysis performed in step 1004. The tag data may be modified in any suitable way that is based on the analysis performed in step 1004. For example, the analysis may determine one or more tags that are considered to be of relatively lower quality than other tags in the aggregation (e.g., because the tags specify partial segments compared to the segments of the other tags). Based on this determination, tag optimization facility 106 may prevent the lower quality tags from being made available for distribution and/or may delete the lower quality tags from the aggregation.

As another example, step 1006 may include modifying any attribute of one or more of the tags in the aggregation of tags. For instance, timestamp data of one or more tags may be merged together by modifying tag data representative of timestamps in a tag. To illustrate, a first tag may specify a first segment of media content (e.g., a first part of an opening monologue of a television program titled "Conan") and a second tag may specify a second segment of media content (e.g., a second part of the opening monologue of "Conan"). Tag optimization facility 106 may determine from the analysis in step 1004 that a merger of the segments, or at least portions of the segments, may produce a merged segment that is more likely to produce a quality user experience when viewed. Accordingly, tag optimization facility 106 may modify timestamp data to effectively merge the two segments into one segment specified by a tag.

Additionally or alternatively, step 1006 may include modifying a tag label of a tag. For instance, tag optimization facility 106 may determine from the analysis in step 1004 that a particular label is commonly used by and widely familiar among users. Accordingly, tag optimization facility 106 may modify tag data to change another tag label to the particular label.

As another example, tag data may be modified to adjust a start point and/or an end point of a segment specified by a tag based on the analysis performed in step 1004. For instance, from the analysis, tag optimization facility 106 may determine a preferred start time and/or end time for a particular segment of media content (e.g., a preferred start time coinciding with the beginning of the opening monologue of "Conan"). The determination may be made based on numerical analysis, statistical analysis, user ratings, and/or user comments associated with the tags, as described above. Based on the determination, tag optimization facility 106 may modify tag data to adjust a start point or an end point to a different point corresponding to the preferred start time or end time determined in the analysis.

In step 1008, the media content tag may be selected for distribution based on the analysis. For example, based on the analysis performed in step 1004, system 100 may determine that the media content tag is an optimal tag within the aggregation of tags. The determination may be based on the analysis in step 1004 and may be configured to promote a quality user experience when the tag is used to access and view the media content or data representative of the media content specified by the tag. For instance, a tag may be selected for distribution based on an analysis of user ratings, timestamp data, labels, and/or any other attributes of the tags included in the aggregation of tags. To illustrate, the media content tag may specify start and end points of a segment that coincide with preferred start and end times of the segment and may therefore be selected as an optimal tag for distribution.

The above-described example of tag optimization is based on an analysis of an aggregation of media content tags. Accordingly, attributes of the tags included in the aggregation may be leveraged to determine how to optimize one or more of the tags in order to promote quality user experiences when the optimized tags are used to access and view the media content or data representative of the media content specified by the tags.

Figure 11:
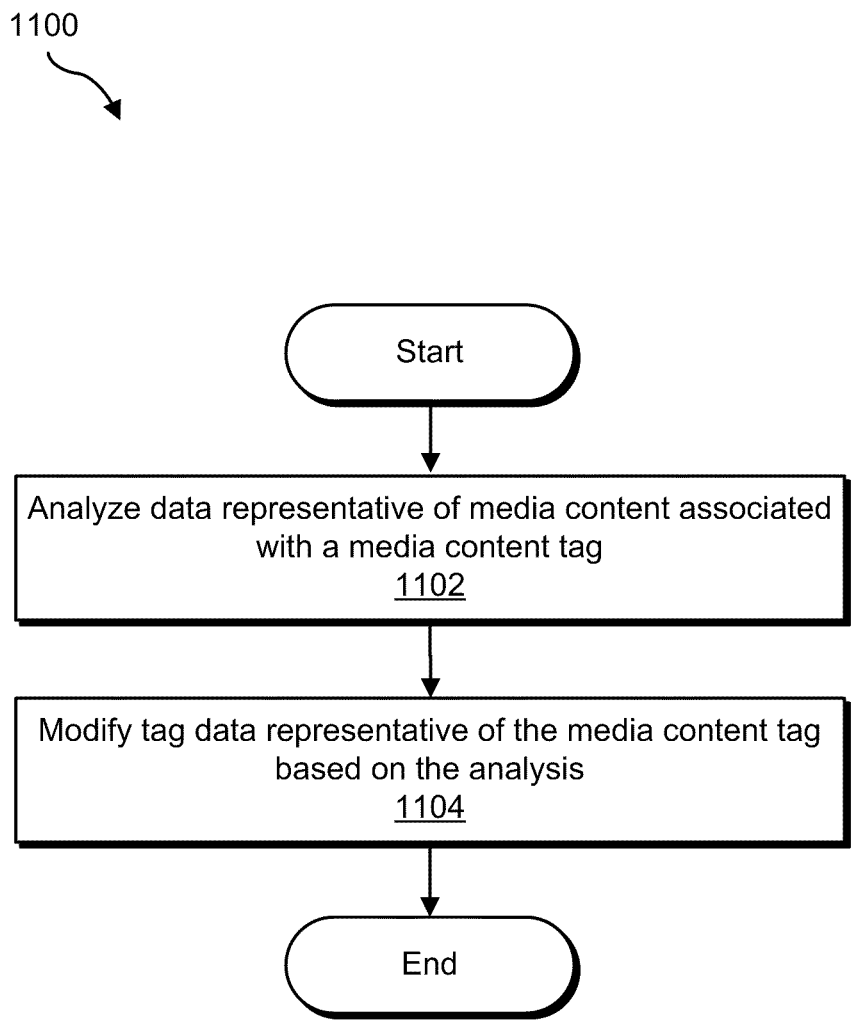
FIG. 11 illustrates another exemplary tag optimization method.

FIG. 11 illustrates another exemplary tag optimization method 1100. In step 1102, data representative of media content associated with a media content tag is analyzed. Step 1102 may include any analysis of media content associated with a media content tag. In certain embodiments, the analysis performed in step 1002 may include analyzing in-stream data included in a media content stream representing the media content associated with the tag. Additionally or alternatively, the analysis performed in step 1102 may include analyzing metadata associated with the media content associated with the tag.

To illustrate an analysis of in-stream media content data, a media content stream may include one or more identifiable points that may be used to analyze a position of a segment defined by a media content tag. System 100 may be configured to analyze a media content stream to identify one or more of the identifiable positions in the stream. The identifiable positions may represent scene changes, hard cuts, fade-ins, fade-outs, audio gaps, video gaps and other attributes of media content included in the media content stream. System 100 may further analyze a segment of media content specified by a media content tag relative to one or more of the identifiable positions in the media content stream. Accordingly, system 100 may determine whether a start point and/or an end point of a segment of media content lines up with or is proximate to one or more identified positions in the media content stream.

In step 1104, tag data representative of the media content tag is modified based on the analysis performed in step 1102. In certain examples, the modification performed in step 1104 may include modifying the tag data to adjust at least one of a start point and end point of a segment defined by the media content tag based on the analysis performed in step 1102. For example. At least one of the start point and end point may be adjusted to a different point in the media content. This may include moving the start point and/or endpoint to a point in the media content that is associated with at least one of a scene change, a hard cut, a fade-in, a fade-out, an audio gap, and a video gap in the media content. In this or a similar manner, at least one of a start point and an end point of a segment defined by the media content tag may be adjusted to coincide with a natural break in or other attribute of the media content based on the analysis performed in step 1102. For instance, when a start point of a segment is determined to be proximate to a point in a media content stream that is indicative of a scene change, system 100 may adjust the start point of the segment to an earlier point that coincides with a beginning of a scene in the media content stream. An end point may be similarly adjusted to coincide with an ending of a scene.

Returning to FIG. 9, in step 908, the optimized media content tag is distributed for use in identifying and presenting the segment of the media content specified by the tag. Step 908 may be performed in any suitable way, including by tag distribution facility 108 transmitting data representative of the tag from a media content access device to one or more other media content access devices on a peer-to-peer basis and/or tagging subsystem 204 transmitting data representative of the tag to one or more media content access devices implementing access subsystems 206. A media content access device that receives the tag may utilize the tag to identify and present the segment of media content specified by the tag when the media content is accessible by the media content access device. In certain embodiments, the tag may be used by the media content access device to obtain access to the media content.

Examples of accessing, using, and further optimizing media content tags will now be described.

Figure 12:
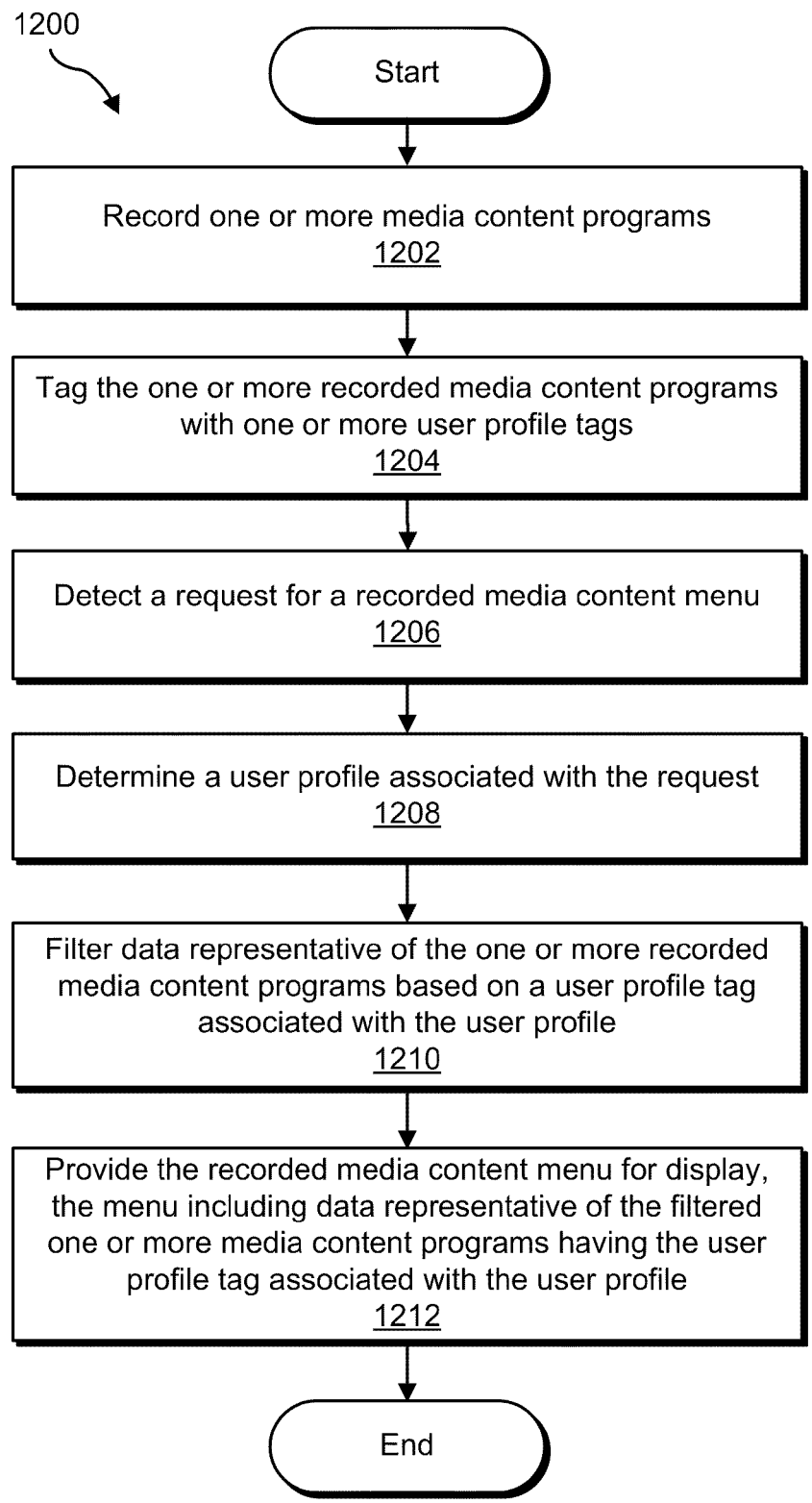
FIG. 12 illustrates an exemplary enhanced media content tagging method.

FIG. 12 illustrates an exemplary enhanced media content tagging method 1200. In step 1202, one or more media content programs are recorded. The media content programs may be recorded in any of the ways described above.

In step 1204, the one or more recorded media content programs are tagged with one or more user profile tags. As described above, media content tags that specify one or more associated user profiles may be referred to as user profile tags. The recorded media content programs may be tagged with user profile tags in any of the ways described above, including by automatically assigning to recorded media content a user profile tag specifying a user profile that is associated with the recording of the media content based (e.g., a user profile that is active when the recording is scheduled or otherwise initiated) or by assigning to the recorded media content a user profile tag in response to user input indicating that the user profile tag is to be assigned to the recorded media content.

In step 1206, a request for a recorded media content menu is detected. For example, a user of a media content access device may provide user input requesting a display of a recorded media content menu. User interface facility 110 of system 100 may detect the request for the menu.

In step 1208, a user profile associated with the request is determined. For example, system 100 may determine that the user profile is active when the request for the menu is detected in step 1206. Alternatively, the user profile may be specified in the request. For example, when the user provides input requesting the recorded media content menu, the user may also provide input specifying a user profile to be associated with the request.

In step 1210, data representative of the one or more recorded media content programs is filtered based on a user profile tag associated with the user profile determined in step 1208. For example, system 100 may filter the data representative of the one or more recorded media content programs to create a filtered list of data representative of only the recorded media content programs that are associated with the user profile.

In step 1212, the recorded media content menu is provided for display. The menu may include data representative of the filtered one or more media content programs having the user profile tag associated with user profile. Accordingly, a user may be presented with a personalized view including only the recorded programs that have user profile tags associated with the user's profile. The user, therefore, may avoid having to search through other recorded programs that are associated with one or more other users and that may not be of interest to the user.

FIGS. 13-18 illustrate exemplary GUIs associated access, utilization, and/or further optimization of media content tags.

Figure 13:
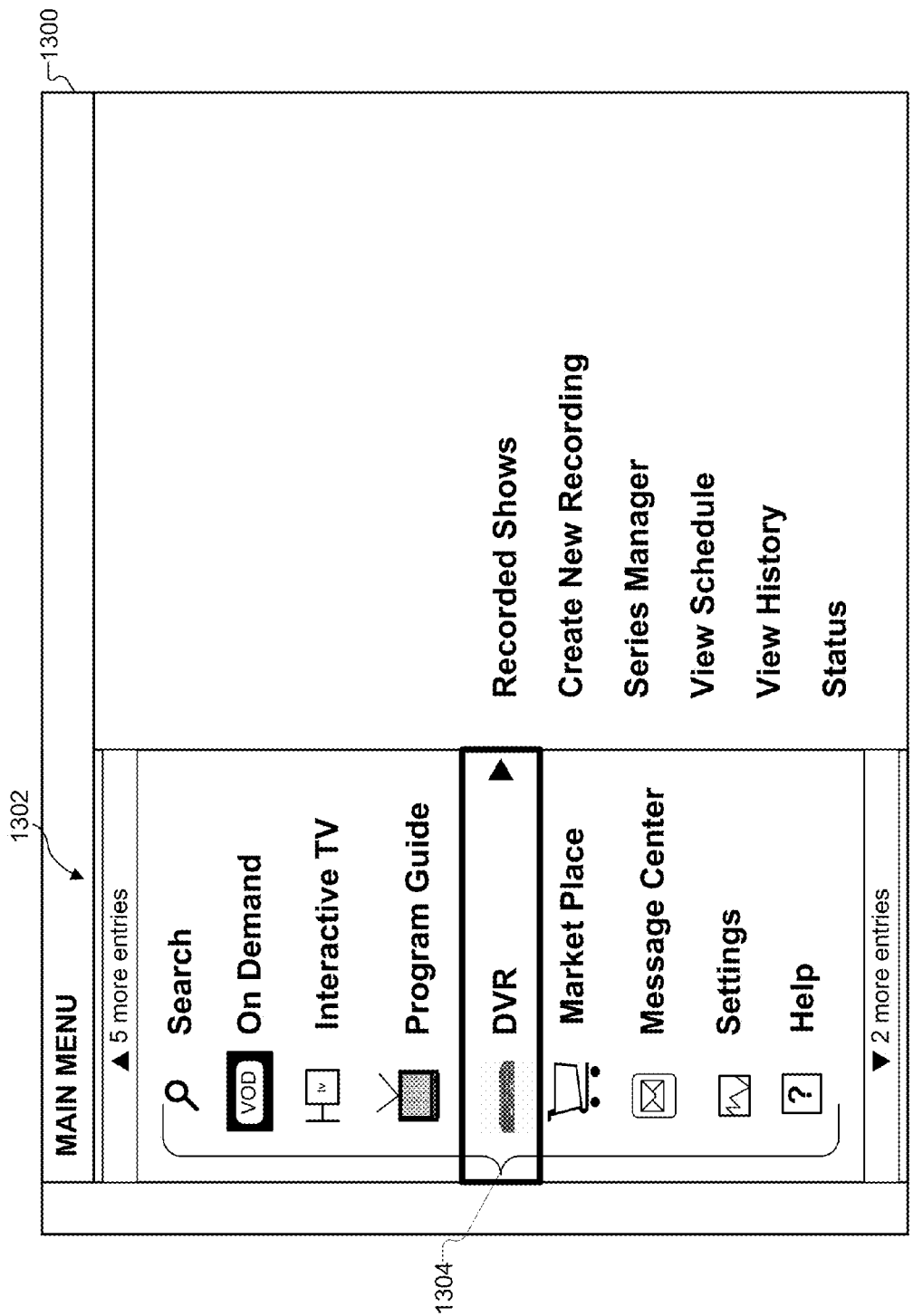
FIG. 13 illustrates a graphical user interface having an exemplary main menu view displayed therein.

FIG. 13 illustrates a GUI 1300 having a main menu view 1302 displayed therein. As shown in FIG. 13, main menu view 1302 may include a plurality of menu options 1304. In response to a user selection of a "DVR" (digital video recording) menu option within the plurality of menu options 1304, a DVR main menu view may be provided for display.

Figure 14:
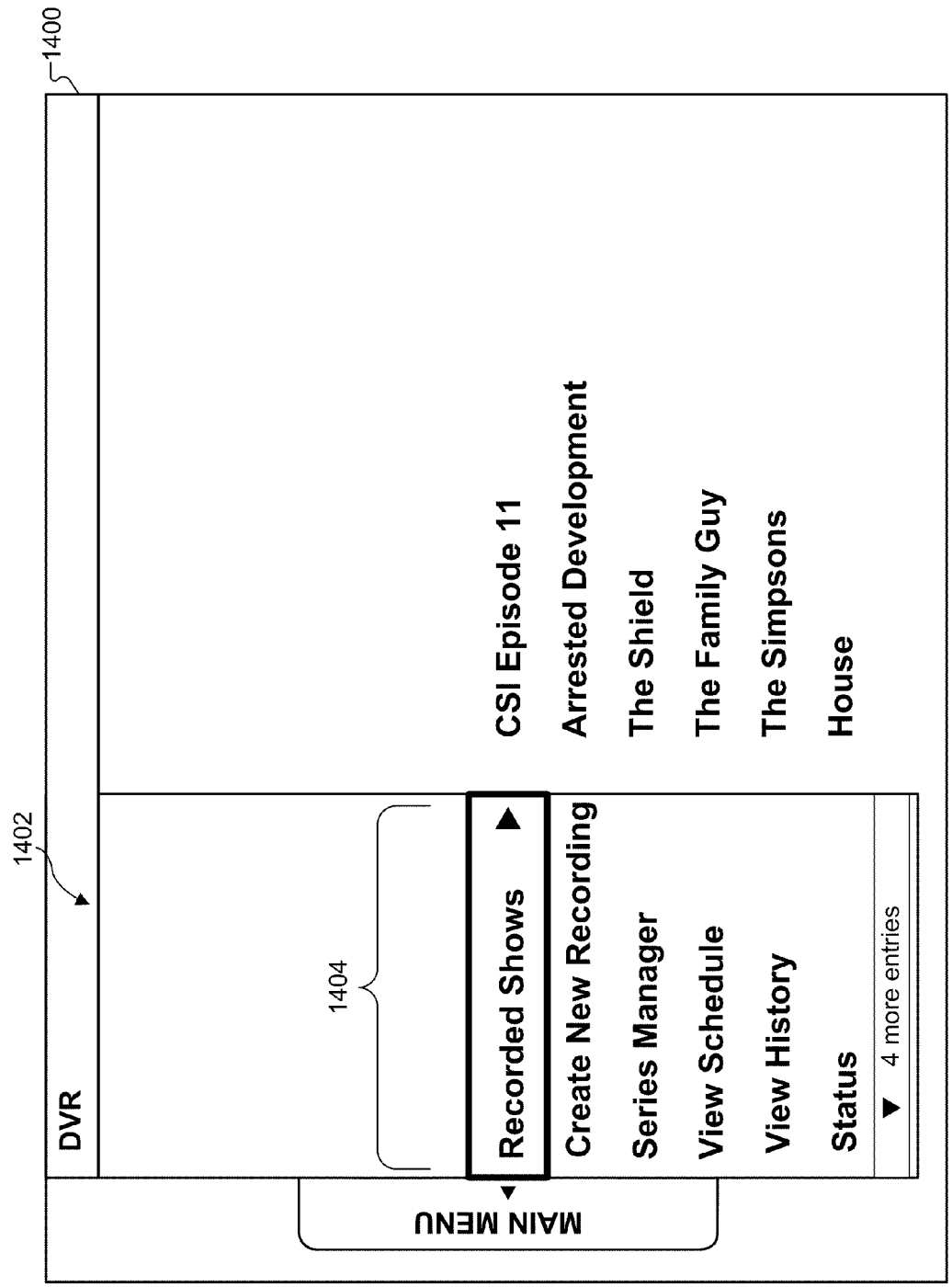
FIG. 14 illustrates a graphical user interface having an exemplary digital video recording ("DVR") menu displayed therein.

For example, FIG. 14 illustrates a GUI 1400 having an exemplary DVR menu view 1402 displayed therein. As shown in FIG. 14, DVR menu view 1402 may include a plurality of DVR menu options 1404 displayed therein. In response to a user selection of a "recorded shows" option within the DVR menu options 1404, a recorded shows menu view may be provided for display.

Figure 15:
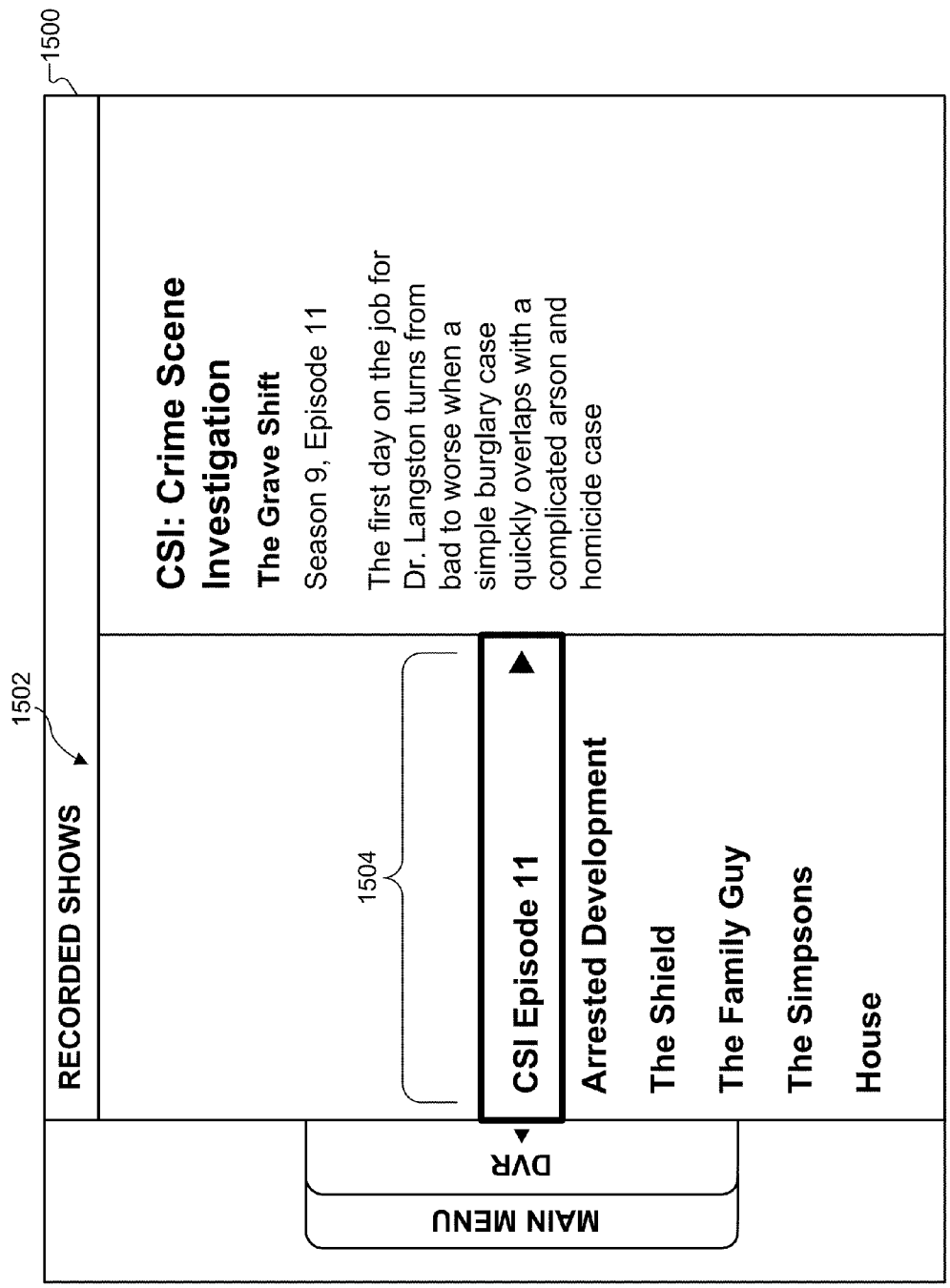
FIG. 15 illustrates a graphical user interface having an exemplary recorded shows menu view displayed therein.

For example, FIG. 15 illustrates a GUI 1500 having an exemplary recorded shows menu view 1502 (i.e., a menu including data representative of recorded media content) displayed therein. As shown in FIG. 15, recorded shows menu view 1502 may include graphical data representative of a plurality of recorded shows 1504 displayed therein. The recorded shows represented in recorded shows menu view 1502 may comprise media content programs that have been recorded by processing facility 102 to storage facility 112. The recorded shows represented in recorded shows menu view 1502 may represent all shows recorded by processing subsystem 102 and stored in storage facility 112 or a filtered list of the recorded shows. The filtered list may be generated based on one or more user profile tags, as described above. In the example illustrated in FIG. 15, one of the recorded shows is labeled "CSI Episode 11," which corresponds to a particular recorded media content program.

Figure 16:
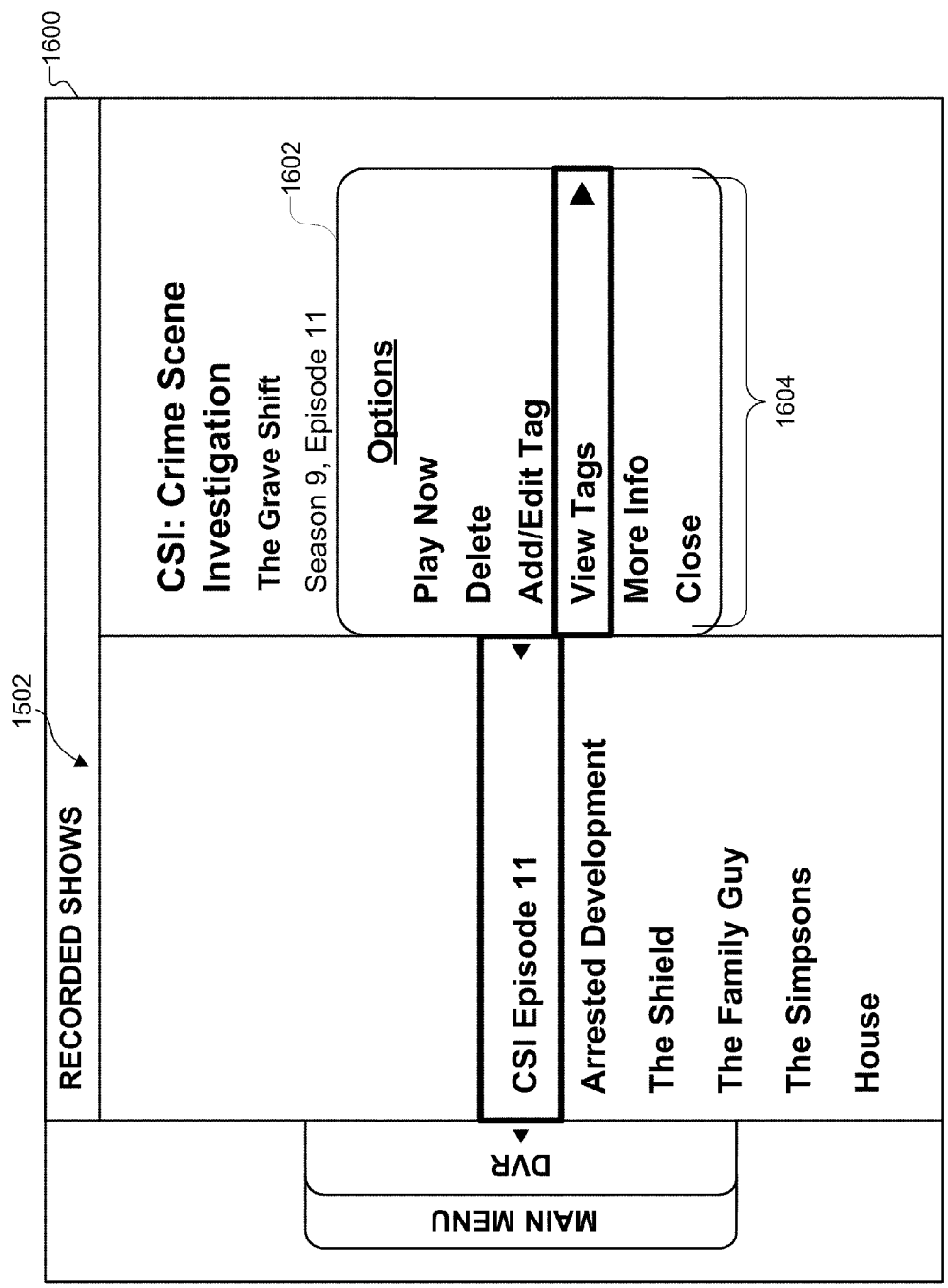
FIG. 16 illustrates a graphical user interface having exemplary selectable options associated with a selected media content program displayed therein.

In response to a user selection of a menu option associated with a recorded media content program in recorded shows menu view 1502, a program options view may be provided for display. For example, FIG. 16 illustrates a GUI 1600 having an exemplary program options view 1602 displayed therein. As shown in FIG. 16, program options view 1602 may include a plurality of options 1604 associated with the selected media content program (e.g., the media content program known as "CSI Episode 11"). In the illustrated example, the plurality of options 1604 includes a "play now" option, a "delete" option, a "view tags" option, a "more info" option, and a "close" option. In response to a user selection of the "user tags" option shown in FIG. 16, a user tags view may be provided for display.

Figure 17:
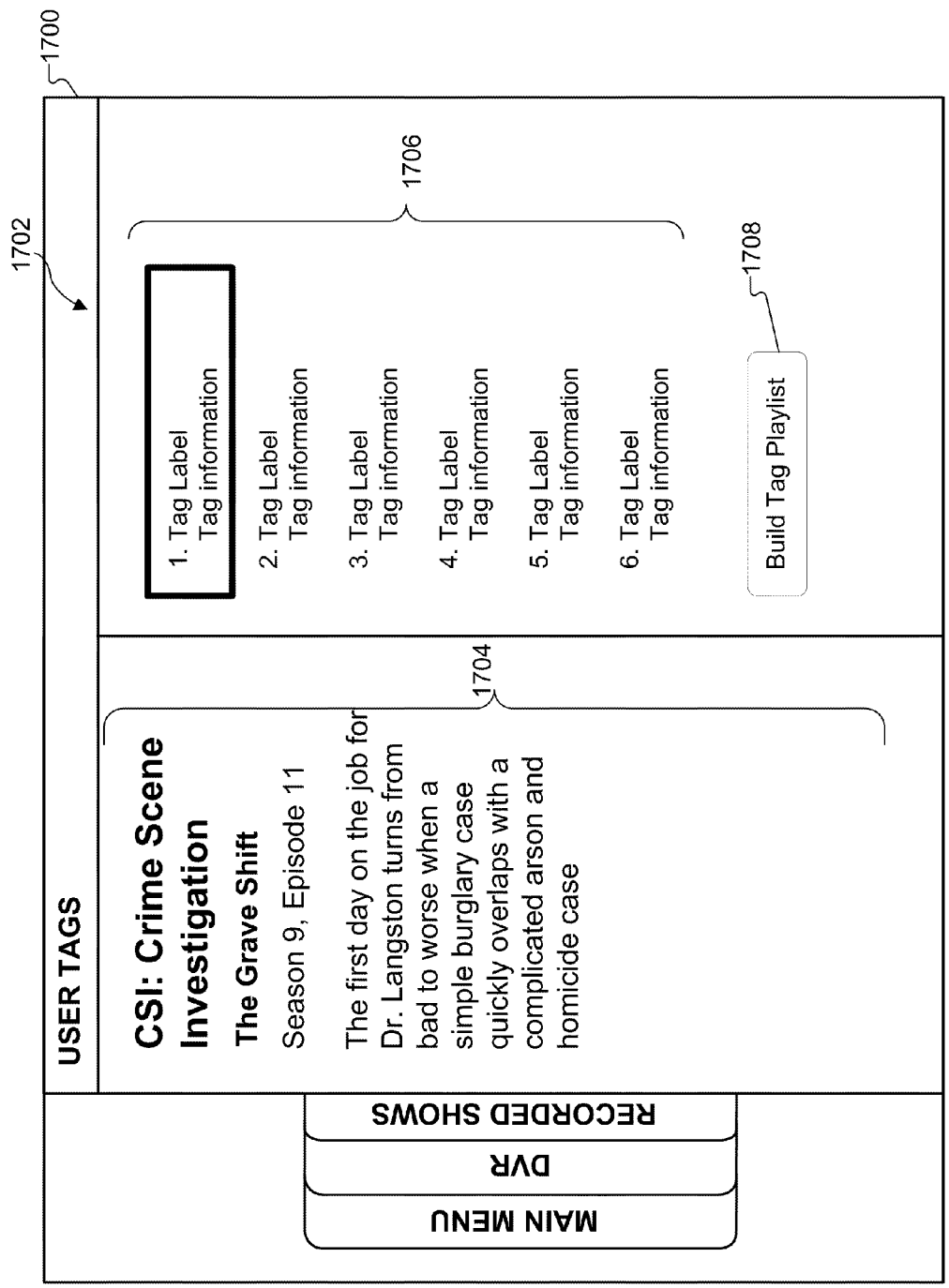
FIG. 17 illustrates a graphical user interface having an exemplary media content tags view displayed therein.

For example, FIG. 17 illustrates a GUI 1700 having an exemplary user tags view 1702 displayed therein. As shown in FIG. 17, user tags view 1702 may include information 1704 about a selected media content program (e.g., a media content program known as "CSI Episode 11"). In addition, user tags view 1702 may include graphical data representative of tag data 1706 associated with the selected media content program. In the example illustrated in FIG. 17, tag data 1706 includes a list of a plurality of tags and information specified by the tags. For example, for each tag included in the list, data representative of a tag label may be displayed. Other tag information may also be displayed, including information indicating user profiles, user ratings, user feedback, and timestamp data associated with the tags.

As part of generating user tags view 1702 for display, user interface facility 110 may request and receive data representative of tag data 1706 associated with the selected media content program from tag distribution facility 108, which may be implemented by tagging subsystem 204, media content access subsystem 206, or a combination thereof.

Figure 18:
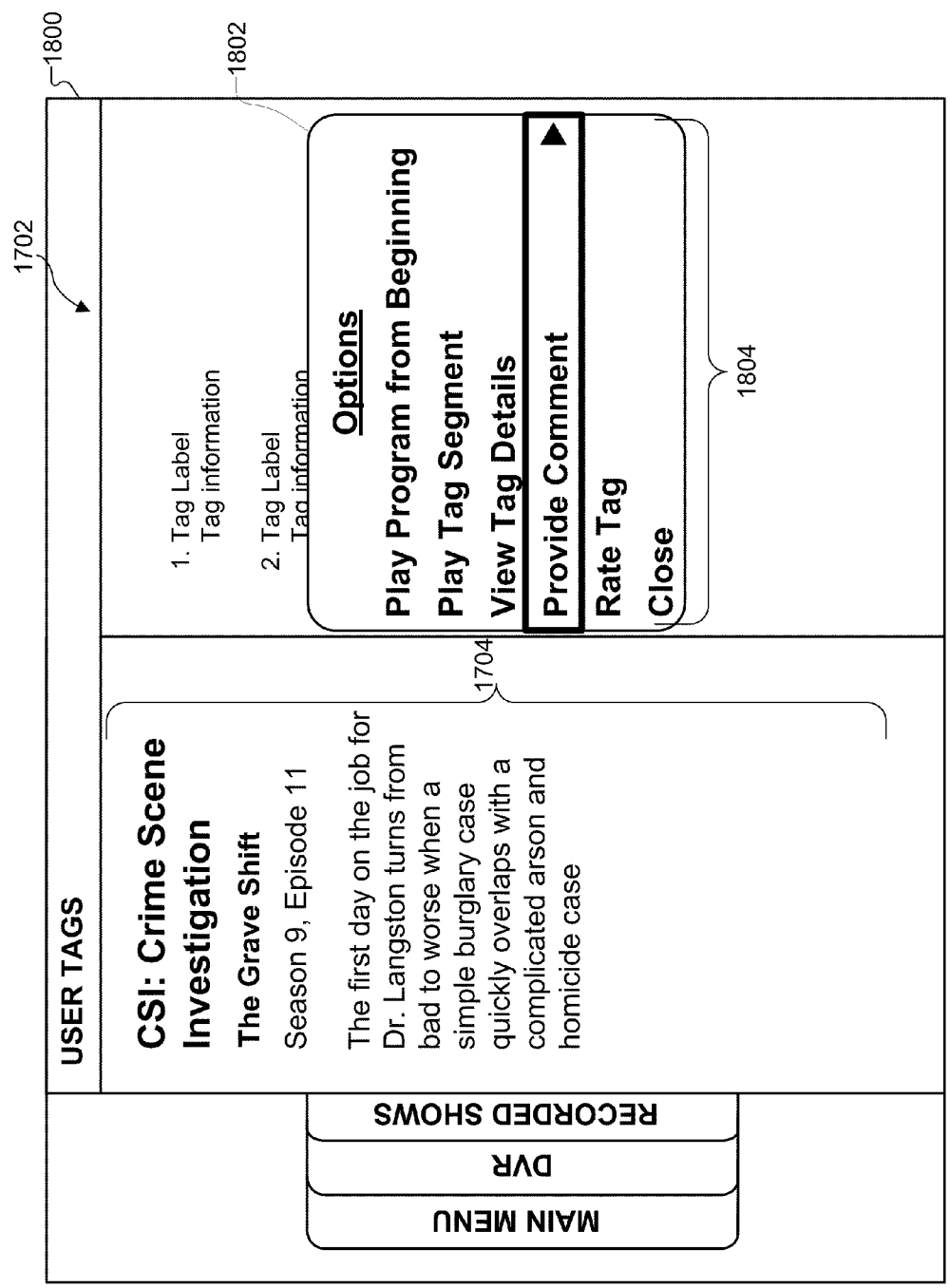
FIG. 18 illustrates a graphical user interface having exemplary selectable options associated with a selected media content tag displayed therein.

As shown in FIG. 18, user tags view 1702 may include a "build tag playlist" option 1708, which when selected may trigger a launch of a playlist tool configured to enable a user to create a playlist of one or more tagged segments of media content. In response to receipt of user input specifying one or more tagged segments of media content, system 100 may generate a playlist tag specifying the tagged segments. The playlist tag may be distributed, accessed, and used to identify and present the tagged segments to another user.

A playlist defined by a user may include one or more segments of a media content program arranged in any order indicated by the user. Alternatively, a playlist defined by a user may include one or more segments of multiple media content programs. For example, a playlist may include opening monologue segments from multiple episodes of "Conan." Accordingly, once a playlist tag specifying the playlist has been defined by a user, generated, and made available for access, another user may request and view the opening monologue segments of the multiple episodes of "Conan" in accordance with the playlist specified by the playlist tag.

In response to a user selection of one of the tags displayed in user tags view 1702 of FIG. 17, a tagging options view may be provided for display. For example, FIG. 18 illustrates a GUI 1800 having an exemplary tagging options view 1802 displayed therein. As shown in FIG. 18, tagging options view 1802 may include a plurality of selectable options 1804 displayed therein. In the example illustrated in FIG. 18, the options 1804 include a "play program from beginning" option, a "play tag segment" option, a "view tag details" option, a "provide comment" option, a "rate tag" option, and a "close" option. In response to a user selection of the "play program from beginning" option, processing facility 102 may initiate presentation of the media content program associated with the selected tag from a beginning of the media content program. In response to a user selection of the "play tag segment" option, processing facility 102 may initiate presentation of the segment of the media content program specified by the selected tag. In response to a user selection of the "view tag details" option, user interface facility 110 may provide a view of the additional details about the tag. In response to a user selection of the "provide comment" option, user interface facility 110 may provide one or more tools configured to allow a user to provide a comment about the tag. In response to a user selection of the "rate tag" option, user interface facility 110 may provide one or more tools configured to allow a user to rate the tag. The exemplary options 1804 displayed in FIG. 18 are illustrative only. Other options related to a selected tag may be provided in other embodiments.

The providing of user feedback such as user comment tools and/or tag rating tools mentioned above may facilitate further optimization of one or more media content tags. For example, users may provide comments and/or ratings to media content tags. The comments and/or ratings may be custom-defined by users or selected by users from a group of selectable predefined comments and/or ratings. The selectable predefined comments and/or ratings may be designed to facilitate optimization of media content tags. For example, certain predefined comments may include comments such as "segment started too late" or "segment ended too early," which comments may be utilized in analyzing and optimizing media content tags in any of the ways described above.

The comments and/or ratings provided by users may be associated by system 100 with the media content tags in a repository of media content tags and taken into consideration in subsequent optimization operations, which may be performed in accordance with any of the exemplary optimization operations described above. Accordingly, a collaborative repository of media content tags may be provided that facilitates user-based community policing and/or optimization of the media content tags included in the repository. In certain applications, an operator of the repository may provide one or more incentives to users to encourage participation in media content tagging collaboration.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a media content tagging system from a first media content access device, tag data representative of a first user-defined tag specifying a segment of media content recorded by the first media content access device to a local storage facility included in the first media content access device in response to a first user request that the media content be recorded;
    optimizing, by the media content tagging system, the first user-defined tag, the optimizing of the first user-defined tag comprising:
        aggregating the first user-defined tag with one or more other user-defined tags based on at least one attribute common to the first user-defined tag and the one or more other user-defined tags;
        analyzing the aggregation of the first user-defined tag and the one or more other user-defined tags to determine at least one of a preferred start time and a preferred end time of the segment of media content; and
        selecting, from the aggregation of the first user-defined tag and the one or more other user-defined tags and based on the analyzing of the aggregation of the first user-defined tag and the one or more other user-defined tags, the first user-defined tag for distribution as an optimized first user-defined tag;
    receiving, by the media content tagging system from a second media content access device that recorded the media content to a local storage facility included in the second media content access device in response to a second user request that the media content be recorded, a request for a media content tag; and
    transmitting, by the media content tagging system in response to the request for the media content tag, data representative of the optimized first user-defined tag to the second media content access device for use by the second media content access device to identify and present, from the media content recorded by the second media content access device to the local storage facility included in the second media content access device, a segment of the media content specified by the optimized first user-defined tag.

2. The method of claim 1, wherein the optimizing further comprises modifying the tag data representative of the first user-defined tag to merge at least a portion of another segment of the media content specified by one of the other user-defined tags with the segment of the media content specified by the first user-defined tag.

3. The method of claim 1, wherein the optimizing further comprises modifying the tag data representative of the first user-defined tag to adjust at least one of a start point and an end point of the segment based on the analyzing of the aggregation of the first user-defined tag and the one or more other user-defined tags to at least one of a different point in the media content corresponding to the preferred start time of the segment of media content and a different point in the media content corresponding to the preferred end time of the segment of media content.

4. The method of claim 1, wherein the at least one attribute common to the first user-defined tag and the one or more other user-defined tags comprises at least one of a matching tag label and matching timestamp data.

5. The method of claim 1, wherein the optimizing further comprises:
    analyzing data representative of the media content recorded by the first media content access device; and
    modifying the tag data representative of the first user-defined tag to adjust at least one of a start point and an end point of the segment based on the analyzing of the data representative of the media content recorded by the first media content access device.

6. The method of claim 5, wherein the modifying adjusts at least one of the start point and the end point to a different point in the media content recorded by the first media content access device, the different point associated with at least one of a scene change, a hard cut, a fade-in, a fade-out, an audio gap, and a video gap in the media content recorded by the first media content access device.

7. The method of claim 5, wherein the analyzing of the data representative of the media content recorded by the first media content access device comprises analyzing data included in a media content stream representative of the media content recorded by the first media content access device.

8. The method of claim 1, further comprising receiving, by the media content tagging system, user feedback data from the second media content access device, the user feedback data including at least one of a custom user comment associated with the first user-defined tag, a selected predefined comment associated with the first user-defined tag, and a user rating of the first user-defined tag.

9. The method of claim 1, further comprising associating, by the media content tagging system, a user profile with the first user-defined tag.

10. The method of claim 1, embodied as computer-executable instructions on at least one tangible computer-readable medium.

11. The method of claim 1, wherein:
    the analyzing of the aggregation of the first user-defined tag and the one or more other user-defined tags further includes determining that the first user-defined tag specifies at least one of a start time and an end time that coincides with the at least one of the preferred start time and the preferred end time; and
    the selecting, from the aggregation of the user-defined tag and the one or more other user-defined tags, the first user-defined tag for distribution as the optimized first user-defined tag is based on the determination that the first user-defined tag specifies the at least one of the start time and the end time that coincides with the at least one of the preferred start time and the preferred end time.

12. A computing system comprising:
    a first media content access device that records media content to a local storage facility included in the first media content access device in response to a request by a user of the first media content access device that the media content be recorded;
    a second media content access device that records the media content to a local storage facility included in the second media content access device in response to a request by a user of the second media content access device that the media content be recorded;
    a media content tagging subsystem comprising at least one computing device having a processor and communicatively coupled to the first media content access device and the second media content access device, the media content tagging subsystem configured to receive, from the first media content access device, tag data representative of a first user-defined tag specifying a segment of the media content;

optimize the first user-defined tag by aggregating the first user-defined tag with one or more other user-defined tags based on at least one attribute common to the first user-defined tag and the one or more other user-defined tags;

analyzing the aggregation of the first user-defined tag and the one or more other user-defined tags to determine at least one of a preferred start time and a preferred end time of the segment of media content; and selecting, from the aggregation of the first user-defined tag and the one or more other user-defined tags and based on the analyzing of the aggregation of the first user-defined tag and the one or more other user-defined tags, the first user-defined tag for distribution as an optimized first user-defined tag, receive, from the second media content access device, a request for a media content tag, and transmit, in response to the request for the media content tag, data representative of the optimized first user-defined tag to the second media content access device for use by the second media content access device to identify and present, from the media content recorded by the second media content access device to the local storage facility included in the second media content access device, a segment of the media content specified by the optimized first user-defined tag.

13. The computing system of claim 12, wherein the media content tagging subsystem is further configured to optimize the first user-defined tag by modifying the tag data representative of the first user-defined tag to merge at least a portion of another segment of the media content specified by one of the other user-defined tags with the segment of the media content specified by the first user-defined tag.

14. The computing system of claim 12, wherein the media content tagging subsystem is further configured to optimize the first user-defined tag by modifying the tag data representative of the first user-defined tag to adjust at least one of a start point and an end point of the segment based on the analyzing of the aggregation of the first user-defined tag and the one or more other user-defined tags.

15. The computing system of claim 12, wherein the at least one attribute common to the first user-defined tag and the one or more other user-defined tags comprises at least one of a matching tag label and matching timestamp data.

16. The computing system of claim 12, wherein the media content tagging subsystem is further configured to optimize the first user-defined tag by:

analyzing data representative of the media content; and modifying the tag data representative of the first user-defined tag to adjust at least one of a start point and an end point of the segment based on the analyzing of the data representative of the media content.

17. The computing system of claim 16, wherein the modifying adjusts at least one of the start point and the end point to a different point in the media content, the different point associated with at least one of a scene change, a hard cut, a fade-in, a fade-out, an audio gap, and a video gap in the media content.

18. The computing system of claim 16, wherein the analyzing of the data representative of the media content comprises analyzing data included in a media content stream representative of the media content.

19. The computing system of claim 12, wherein the media content tagging subsystem is further configured to receive user feedback data from the second media content access device, the user feedback data including at least one of a custom user comment associated with the first user-defined tag, a selected predefined comment associated with the first user-defined tag, and a user rating of the first user-defined tag.

* * * * *